(12) United States Patent
Hakkaku et al.

(10) Patent No.: US 10,647,052 B2
(45) Date of Patent: May 12, 2020

(54) SHAPED ARTICLE

(71) Applicant: MIMAKI ENGINEERING CO., LTD., Nagano (JP)

(72) Inventors: Kunio Hakkaku, Nagano (JP); Hirofumi Hara, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 55 days.

(21) Appl. No.: 15/116,513

(22) PCT Filed: Feb. 4, 2015

(86) PCT No.: PCT/JP2015/053039
§ 371 (c)(1),
(2) Date: Aug. 4, 2016

(87) PCT Pub. No.: WO2015/119130
PCT Pub. Date: Aug. 13, 2015

(65) Prior Publication Data
US 2016/0346996 A1 Dec. 1, 2016

(30) Foreign Application Priority Data

Feb. 5, 2014 (JP) .................. 2014-020776
Feb. 5, 2014 (JP) .................. 2014-020784
Feb. 5, 2014 (JP) .................. 2014-020786

(51) Int. Cl.
*B32B 1/00* (2006.01)
*B32B 3/10* (2006.01)
(Continued)

(52) U.S. Cl.
CPC .......... *B29C 64/112* (2017.08); *B29C 64/129* (2017.08); *B29C 64/40* (2017.08);
(Continued)

(58) Field of Classification Search
CPC .... Y10T 428/24942; Y10T 428/24612; B33Y 10/00; B33Y 80/00; B32B 2307/416; B32B 1/00; B32B 3/10; B32B 3/18
(Continued)

(56) References Cited

U.S. PATENT DOCUMENTS 6,033,516 A * 3/2000 Steininger ................. B32B 7/02
156/277
6,490,819 B1 * 12/2002 Kumata .................. G09F 13/16
40/208
(Continued)

FOREIGN PATENT DOCUMENTS

CN 1244022 2/2000
EP 2078613 7/2009
(Continued)

OTHER PUBLICATIONS

"Office Action of Japan Counterpart Application," with English translation thereof, dated Dec. 5, 2017, p. 1-p. 7.
(Continued)

*Primary Examiner* — Joanna Pleszczynska
(74) *Attorney, Agent, or Firm* — JCIPRNET

(57) ABSTRACT

A shaped article successfully decorated as desired and a manufacturing method for the shaped article are provided. The shaped article is manufactured by multilayer lamination technique, in which a colored layer, a first transparent layer, and a light reflective layer are formed in this order from an outer-layer side toward an inner side of the shaped article.

10 Claims, 8 Drawing Sheets

(51) Int. Cl.
  B32B 3/18 (2006.01)
  B33Y 80/00 (2015.01)
  B29C 64/112 (2017.01)
  B33Y 10/00 (2015.01)
  B29C 64/129 (2017.01)
  B29C 64/40 (2017.01)
  B29K 105/00 (2006.01)
  B29K 105/16 (2006.01)
  B29K 505/00 (2006.01)

(52) U.S. Cl.
  CPC ............... B32B 1/00 (2013.01); B33Y 10/00 (2014.12); B33Y 80/00 (2014.12); *B29K 2105/0032* (2013.01); *B29K 2105/0058* (2013.01); *B29K 2105/16* (2013.01); *B29K 2505/00* (2013.01); *B32B 2307/402* (2013.01); *B32B 2307/412* (2013.01); *B32B 2307/416* (2013.01)

(58) Field of Classification Search
  USPC ...................................................... 428/542.2
  See application file for complete search history.

(56) References Cited

U.S. PATENT DOCUMENTS

2002/0167101 A1    11/2002  Tochimoto et al.
2008/0191386 A1*    8/2008  Fukada ............. B29C 45/14467
                                                                264/275

FOREIGN PATENT DOCUMENTS

| JP | H10296906 | 11/1998 |
| JP | 2000-280354 | 10/2000 |
| JP | 2000280354 | 10/2000 |
| JP | 2003071530 | 3/2003 |
| WO | 2006057198 | 6/2008 |
| WO | 2012176593 | 12/2012 |
| WO | 2013149891 | 10/2013 |

OTHER PUBLICATIONS

"Office Action of Japan Counterpart Application," with English translation thereof, dated Dec. 5, 2017, p. 1-p. 5.
"First Office Action of China Counterpart Application" with English translation thereof, dated Mar. 28, 2017, p. 1-p. 16, in which the listed references were cited.
"Partial Search Report of Europe Counterpart Application", dated Dec. 12, 2016, p. 1-p. 6, in which the listed reference was cited.
"Office Action of Japan Counterpart Application," with English translation thereof, dated Sep. 26, 2017, p. 1-p. 8, in which the listed reference was cited.
"Office Action of Japan Counterpart Application," with English translation thereof, dated Sep. 5, 2017, p. 1-p. 5, in which the listed reference was cited.
"Office Action of Japan Counterpart Application," with English translation thereof, dated Sep. 5, 2017, p. 1-p. 7, in which the listed reference was cited.
"International Search Report (Form PCT/ISA/210) of PCT/JP2015/053039", dated May 12, 2015, with English translation thereof, pp. 1-4.
"Search Report of European Counterpart Application" dated Apr. 13, 2018, p. 1-p. 7.

* cited by examiner

SHAPED ARTICLE

CROSS-REFERENCE TO RELATED APPLICATION

This application is a 371 of international application of PCT application serial no. PCT/JP2015/053039, filed on Feb. 4, 2015, which claims the priority benefits of Japan application no. JP 2014-020776, filed on Feb. 5, 2014, Japan application no. JP 2014-020786, filed on Feb. 5, 2014, and Japan application no. JP 2014-020784, filed on Feb. 5, 2014. The entirety of each of the abovementioned patent applications is hereby incorporated by reference herein and made a part of this specification.

TECHNICAL FIELD

This disclosure relates to a shaped article.

BACKGROUND ART

Examples of known techniques that may be employed to mold three-dimensional objects include the sheet lamination method as described in Patent Literature 1, as well as fuse deposition molding (FDM), inkjet method, inkjet binder method, stereolithography (SL), and selective laser sintering (SLS).

Among the known techniques is often employed a technique, pattern lamination, wherein ultraviolet-curable resins are discharged from 3D printers to form multilayered objects. To produce a three-dimensional object, this method generates data of exterior and interior designs and structures of a final product using a three-dimensional CAD, and slices the data using a computer to generate a multilayer laminate pattern data. Then, an ultraviolet-curable resin is discharged from a head according to the pattern data and stacked in layers.

Conventionally, three-dimensional objects thus molded may be decorated (with patterns and/or colors).

CITATION LIST

Patent Literature

Patent Literature 1: JP 2003-71530 A (disclosed on Mar. 11, 2003)

SUMMARY

Technical Problems

The inventors of this application found a problem with the known inkjet 3D molding, which occurred when a molding ink and decorative inks (coloring inks of, for example, yellow, magenta, cyan, and black) were discharged by inkjet printing technique. The problem is, once the molding ink and the decorative inks blend into one another at their interfaces, a shaped article may no longer be decorated as desired (failure to record characters and images in colors by way of subtractive color mixture).

Such intermixing of inks may be more apparent, particularly, in parts to be decorated on a mold surface extending in a direction perpendicular to the in-plane direction of layers. This is because relative movements of an inkjet head and a shaped article along the in-plane direction of layers may be prone to lower the positional accuracy in the in-plane direction of inks discharged from the inkjet head, consequently causing the molding ink and the decorative inks to be intermixed.

In view of the issue, this disclosure is directed to providing a shaped article that may be decorated as desired, and a manufacturing method for such a shaped article.

Solutions to the Problems

To address the issue, a shaped article disclosed herein includes: a light reflective layer formed from an ink having light reflectiveness; a decorative layer; and a first transparent layer formed from a transparent ink, wherein the decorative layer, the first transparent layer, and the light reflective layer are formed in this order from an outer-layer side toward an inner side of the shaped article.

This shaped article has the first transparent layer between the decorative layer and the light reflective layer, preventing the light reflective ink forming the light reflective layer from blending into an ink forming the decorative layer. Supposing that the decorative layer is a colored layer formed from a colorant-containing ink, the colorant-containing ink, if mixed with the light reflective ink forming the light reflective layer, may lose its original colors, thereby failing to produce an intended color tone. In this shaped article, however, even if the ink of the decorative layer is mixed into the transparent ink of the first transparent layer, this does not deprive the decorative layer ink of its original colors, producing no adverse impact on decorative effects of the shaped article. The shaped article, therefore, may be successfully decorated as desired.

The shaped article disclosed herein according to an aspect is further characterized in that the light reflective layer is formed from an ink containing a white pigment.

In the shaped article thus further characterized, the light reflective layer formed from the white pigment-containing ink may adequately reflect light entering through the decorative layer from the outer-layer side of the shaped article. As a result, the shaped article may be favorably decorated with colors by the subtractive color mixture.

In another aspect of this disclosure, the shaped article further includes a second transparent layer formed from a transparent ink on the outer-layer side of the decorative layer.

The second transparent layer may serve to protect the decorative layer to prevent decolorization under friction and color fading by exposure to ultraviolet. The second transparent layer may also contribute to elaborateness and high accuracy of the shaped article.

The shaped article disclosed herein according to yet another aspect is further characterized in that the decorative layer formed has its ink density filled by a transparent supplementary ink in a part of the decorative layer in which decorative inks alone are insufficient to meet a predetermined ink density.

Using the decorative inks alone to form the decorative layer may lead to abundant ink supply in its parts to be decorated at higher concentrations, while supplying less inks in its parts to be decorated at lower concentrations. Such variability of the ink density in different parts of the decorative layer may generate irregularities and/or voids in the decorative layer. The irregularities and/or voids may provoke optical diffuse reflection and/or deflection, resulting in unattractive appearance of the decorative layer, or may incur failure to obtain any desired shape of the shaped article in the manufacturing process. On the other hand, the shaped article characterized as described may eliminate the risk of such irregularities and/or voids because the ink density of the decorative layer is filled by the transparent supplementary ink. The shaped article, therefore, may be successfully decorated as desired and also shaped as desired.

The shaped article disclosed herein according to yet another aspect is further characterized in that the shaped article includes a plurality of layers stacked on one another, wherein two or more of the plurality of layers each include a part of the decorative layer, a part of the first transparent layer, and a part of the light reflective layer that are formed in this order from an end side toward a center side of each one of the layers.

In yet another aspect of this disclosure, the shaped article further includes a second transparent layer formed from a transparent ink on the outer-layer side of the decorative layer, wherein the two or more of the plurality of layers each include a part of the decorative layer between a part of the first transparent layer and a part of the second transparent layer.

The shaped article disclosed herein according to yet another aspect is further characterized in having a region in which the layers are stacked on one another, the layers each including a part of the decorative layer between a part of the first transparent layer and a part of the second transparent layer. In this shaped article, in a portion of the region with no overlap between a part of the decorative layer in one of the layers and a part of the decorative layer in another one of the layers on or below the one of the layers, there is an overlap between a part of the decorative layer in one of the layers and a part of the first transparent layer or a part of the second transparent layer in another one of the layers on or below the one of the layers.

Such an overlap in the vertical direction between the decorative layer and the transparent layer may suppress the possibility that the light reflective layer is present on and below the decorative layer (layer overlap ratio). By overlapping the decorative layer with the transparent layer in the vertical direction, intermixing, if any, may occur between the decorative layer and the transparent ink. Hence, the shaped article may be successfully decorated as desired.

A shaped article manufacturing method disclosed herein is a manufacturing method for a shaped article including a decorative layer, a first transparent layer, and a light reflective layer formed from an ink having light reflectiveness, wherein the decorative layer, the first transparent layer, and the light reflective layer are formed in this order from an outer-layer side toward an inner side of the shaped article. This method employs the multilayer lamination technique to form layers and includes a layer forming process including forming a part of the decorative layer, a part of the first transparent layer, and a part of the light reflective layer in this order from an end side toward a center side of each one of the layers.

In the presence of the first transparent layer between the decorative layer and the light reflective layer, the ink of the decorative layer, though possibly mixed with the transparent ink of the first transparent layer during the manufacturing process, may be prevented from blending into the light reflective ink of the light reflective layer. Supposing that the decorative layer is a colored layer formed from a colorant-containing ink, the colorant-containing ink, if mixed with the light reflective ink forming the light reflective layer, may lose its original colors, thereby failing to produce an intended color tone. In this shaped article, however, even if the ink of the decorative layer is mixed into the transparent ink of the first transparent layer, this does not deprive the decorative layer ink of its original colors, producing no adverse impact on decorative effects of the shaped article. The shaped article, therefore, may be successfully decorated as desired.

The shaped article manufacturing method is further characterized in that the layer forming process includes forming a second transparent layer using a transparent ink on the outer-layer side of the decorative layer by forming a part of the second transparent layer at a position nearer to the end side than a part of the decorative layer in each of the layers.

The second transparent layer may serve to protect the decorative layer to prevent decolorization under friction and color fading by exposure to ultraviolet. The second transparent layer may also contribute to elaborateness and high accuracy of the shaped article.

Specifically, a part of the second transparent layer is formed before a part of the decorative layer is formed in each of the layers. This may allow the formed part of the second transparent layer to serve as the outer moat for a part of the decorative layer to be later formed, preventing part of the decorative layer from spreading unintendedly.

At the time of forming the upper decorative layer of two layers vertically formed, the second transparent layer already formed as its underlayer may allow a larger formation area to be secured for the decorative layer. Such an increase of the decorative layer formation area may prevent the risk that the ink applied to form the upper decorative layer runs off an edge of its underlayer and drops downward. Hence, the shaped article may be successfully manufactured as desired.

The shaped article manufacturing method disclosed herein is further characterized in that the layer forming process includes steps of: forming a part of the decorative layer; forming a part of the first transparent layer using a transparent ink; forming a part of the light reflective layer using an ink having light reflectivity; and forming a part of the second transparent layer using a transparent ink, wherein the step of forming a part of the decorative layer is performed subsequent to the step of forming a part of the first transparent layer and the step of forming a part of the second transparent layer to form a part of the decorative layer between the parts of the first transparent layer and the second transparent layer.

Thus, a part of the first transparent layer and a part of the second transparent layer are formed before a part of the decorative layer is formed as described earlier. This may allow the parts of the first and second transparent layers to serve as the outer moat for a part of the decorative layer to be later formed, preventing the part of the decorative layer from spreading unintendedly. The shaped article, therefore, may be successfully manufactured as desired.

The shaped article manufacturing method disclosed herein further includes providing, in a portion of the region with no overlap between a part of the decorative layer in one of the layers and a part of the decorative layer in another one of the layers on or below the one of the layers, an overlap between a part of the decorative layer in one of the layers and a part of the first transparent layer or a part of the second transparent layer in another one of the layers on or below the one of the layers.

The decorative layer may be interposed between the transparent layers in the layer-stacked direction as well. This may avoid an overlap between the parts of the decorative layer in the upper and lower layers. The shaped article thus formed may not exhibit undesirable variability in color tone when viewed in a certain direction or when viewed in another direction inclined from the direction.

The shaped article manufacturing method disclosed herein is further characterized in forming a part of the decorative layer by filling the ink density of the decorative layer using a transparent supplementary ink in a part of the decorative layer in which decorative inks alone are insufficient to meet a predetermined ink density.

By having the ink density of the decorative layer partly filled by the supplementary ink, it may be avoided that the decorative layer partly has undesirable irregularities and/or voids. Using the decorative inks alone to form the decorative layer may lead to abundant ink supply in its parts to be decorated at higher concentrations, while supplying less inks in its parts to be decorated at lower concentrations. Such variability of the ink density in different parts of the decorative layer may generate irregularities and/or voids in the decorative layer. The irregularities and/or voids may provoke optical diffuse reflection and/or deflection, resulting in unattractive appearance of the decorative layer, or may incur failure to obtain any desired shape of the shaped article in the manufacturing process. On the other hand, the shaped article manufacturing method characterized as described may eliminate the risk of such irregularities and/or voids because the ink density of the decorative layer is filled by the transparent supplementary ink. The shaped article, therefore, may be successfully decorated as desired and also shaped as desired.

Effect of the Disclosure

This disclosure may provide a shaped article exhibiting a desired color tone.

DESCRIPTION OF EMBODIMENTS

First Embodiment

An embodiment of a shaped article and a shaped article manufacturing method disclosed herein is hereinafter described referring to FIG. 1 to FIG. 8. The shaped article disclosed herein has a three-dimensional structure constructed of a laminate of layers (formed by multilayer lamination technique). In the embodiment hereinafter described, inkjet printing technique is employed to manufacture the shaped article. This is, however, just an option presented in this disclosure. This disclosure may be applicable to any kinds of manufacturing methods that can obtain a shaped article by leveraging the multilayer lamination technique and decorate its surface (recording of characters and images in colors).

[1] Structure of Shaped Article

Figure 1:
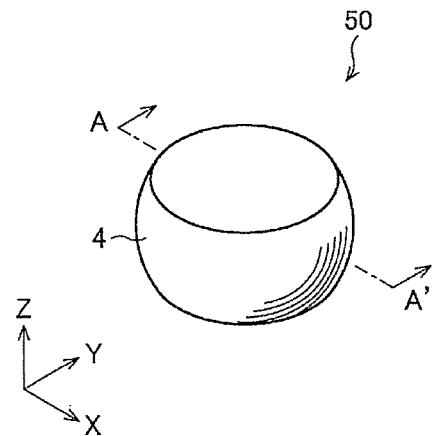
FIG. 1 is a perspective view of an outer shape of a shaped article disclosed herein according to an embodiment.

FIG. 1 is a perspective view of an outer shape of a shaped article 50 according to an embodiment. The shaped article 50 according to this embodiment has a substantially cylindrical shape with a curved side surface bulging outward. The shaped article disclosed herein and the shaped article manufactured by the manufacturing method disclosed herein may not be limited to the shape illustrated in FIG. 1. There are many other examples of the shape, including a hexahedral shape described later, a spherical shape, a hollow structure, a ring-like shape, and a horseshoe-like shape.

The shaped article 50 according to this embodiment includes a second transparent layer, a colored layer (decorative layer) formed from colorant-containing inks (decorative ink), a first transparent layer formed from a transparent ink, and a light reflective layer formed from an ink having light reflectiveness, wherein these layers are formed in the mentioned order from an outer-layer side (outer peripheral side) toward an inner side (center) of the shaped article 50. This is a distinctive technical feature of this disclosure. FIG. 1 is a drawing of the shaped article 50. In this drawing, a second transparent layer 4 formed from a transparent ink, which is the outermost layer, can be seen on the curved side surface of the shaped article 50.

Figure 2:
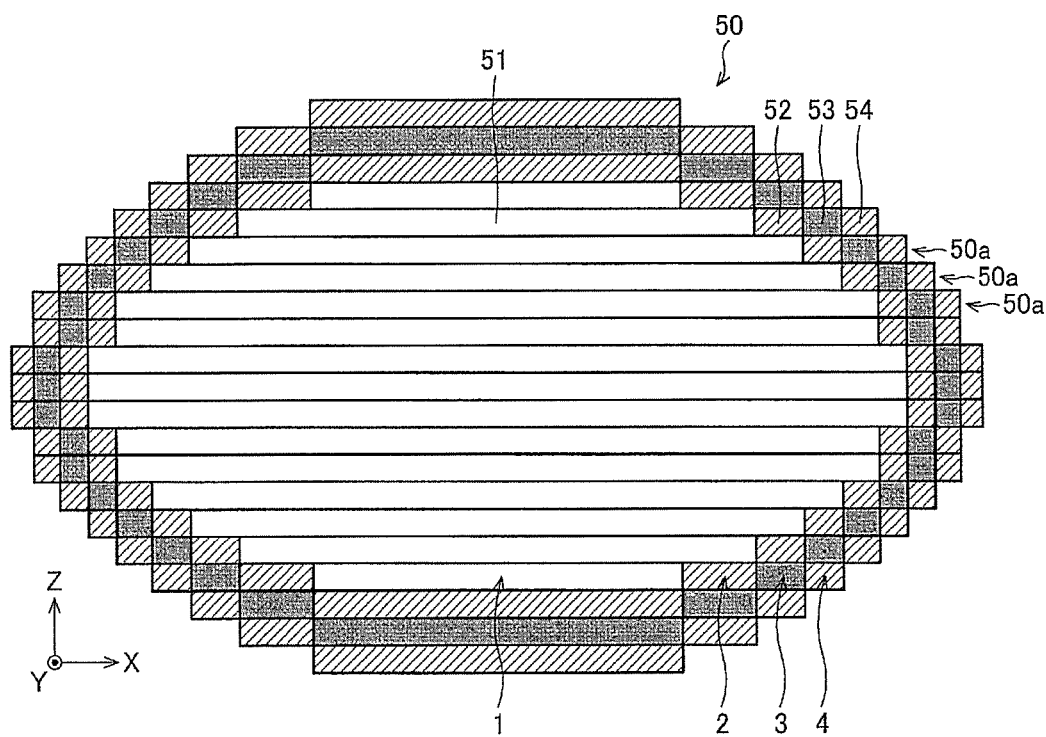
FIG. 2 is a cross-sectional view of the shaped article of FIG. 1 taken along a cutting-plane line A-A'.

FIG. 2 is a cross-sectional view of the illustration of FIG. 1 taken along a cutting-plane line A-A'. The cross-sectional view of the shaped article 50 illustrated in FIG. 2 is taken at a central position of the shaped article 50 along the X-Z plane of the XYZ coordinate system illustrated in FIG. 1.

The embodiment of FIG. 2 presents an example of the shaped article 50 having a three-dimensional structure formed by stacking 21 layers 50a on one another in the Z direction. It should be understood that the shaped article 50 may include less than or more than 21 layers.

[2] Structures of Layers

Figure 5:
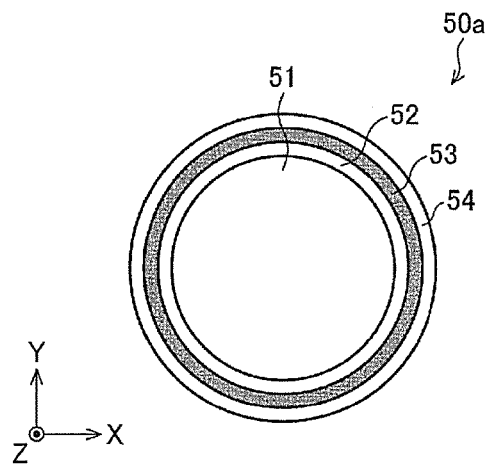
FIG. 5 is an upper view of the shaped article of FIG. 1 currently being manufactured.

FIG. 5 is a drawing of the X-Y plane of a layer 50a in the vicinity of a mid-stage of the shaped article 50. The layers 50a each include a part 54 of the second transparent layer, a part 53 of the colored layer, a part 52 of the first transparent layer, and a part 51 of the light reflective layer. These layers are formed in the mentioned order from an outer peripheral side toward a center side of the shaped article. If the shaped article 50 according to this embodiment is stated another way, the light reflective layer 1, which is the body of the shaped article, is coated with the first transparent layer 2, colored layer 3, and second transparent layer 4 in the mentioned order toward the outer-layer side (outer peripheral side). Each one of the layers 50a has a thickness in the Z direction (vertical direction in the drawing) between 5 μm and 50 μm. This is an adequate range of thickness values for multicolor formation of the colored layer 3 using the subtractive color mixture. For example, a preferable range of thickness values is 10 μm to 25 μm when layers are formed from inks of ultraviolet curing type by inkjet printing technique.

In this embodiment, the light reflective layer 1 is the body of the shaped article; however, the light reflective layer may or may not constitute the body of the shaped article. Specifically, the shaped article may have, at its center, a body or a cavity apart from the light reflective layer, wherein the light reflective layer, first transparent layer, colored layer, and second transparent layer are formed in the mentioned order from the body (may or may not have light reflectiveness) toward the outer-layer side (outer peripheral side). Alternatively, a core (may or may not have light reflectiveness) and the light reflective layer 1 formed on a surface of the core may be collectively regarded as the body of the shaped article.

By stacking the layers 50a in the Z direction as illustrated in FIG. 2, the parts 54 of the second transparent layer in the respective layers 50a are substantially continuous in a direction along the outermost surface of the shaped article 50, forming the second transparent layer 4. The parts 53 of the colored layer in the respective layers 50a are substantially continuous in the direction along the outermost surface of the shaped article 50, forming the colored layer 3. The parts 52 of the first transparent layer in the respective layers 50a are substantially continuous in the direction along the outermost surface of the shaped article 50, forming the first transparent layer 2. The parts 51 of the light reflective layer in the respective layers 50a are substantially continuous in the direction along the outermost surface of the shaped article 50, forming the light reflective layer 1.

Looking at, in any of the X, Y, and Z directions, the outer surface of the shaped article 50 including the second transparent layer, colored layer, first transparent layer, and light reflective layer arranged in the mentioned order, a color tone produced by the subtractive color mixture may be visually recognized.

The parts 52 of the first transparent layer may preferably have a dimension in the direction of X-Y plane slightly greater than the part 53 of the colored layer vertically in contact with the parts 52. This may more reliably prevent intermixing of the inks forming the colored layer 3 and the light reflective layer 1.

The parts 54 of the second transparent layer may preferably have a dimension in the direction of X-Y plane slightly greater than the parts 53 of the colored layer vertically in contact with the parts 54 of the second transparent layer. This may provide for better protection of the colored layer 3.

The width of the shaped article 50 along the Z direction (hereinafter may be referred to as thickness or height in the Z direction) is not particularly limited. The thickness (height) of the layer 50a in the Z direction may be optionally decided depending on the number of layers. As described later, this embodiment constructs the multilayered structure using the inkjet printing technique. Therefore, any feasible values in the technique should be contemplated for the thickness of the layer 50a in the Z direction. When inks of ultraviolet curing type are applied by inkjet printing technique to form the layers (described later), the layer 50a may have a thickness ranging from 5 μm to 20 μm depending on the sizes of ink droplets. As for a large-sized shaped article for which a high resolution is not particularly required, plural layers may be formed based on the same data simply by increasing the sizes of ink droplets. In such a case, a smaller data volume and a higher molding rate may be anticipated.

[3] Structure of Light Reflective Layer 1 (Parts 51 of Light Reflective Layer)

The light reflective layer 1 (parts 51 of the light reflective layer) is a layer formed from a light reflective ink. This layer, therefore, has light reflectiveness that allows rays of light in the whole visible light region to be reflected on at least the surface of the light reflective layer 1 in contact with the colored layer.

Specific examples of ink of the light reflective layer 1 (parts 51 of the light reflective layer) may include metallic powder-containing inks and white pigment-containing inks. The light reflective layer 1 may preferably be formed from a white ink. The light reflective layer 1 formed from a white ink may adequately reflect rays of light entering from the outer-layer side of the shaped article, allowing the shaped article to be colored by the subtractive color mixture.

In this embodiment, the light reflective layer 1 constitutes the body of the shaped article. In case the light reflective layer 1 is formed on the surface of the body of any shaped article for which light reflectiveness is not required, the thickness of the light reflective layer 1, i.e., the width of the part 51 of the light reflective layer from the outer peripheral side to the center side, as illustrated in FIG. 2, may be between 5 μm and 20 μm at the least. The width in this disclosure may include but is not limited to the range of values.

[4] Structure of First Transparent Layer 2 (Parts 52 of First Transparent Layer)

The first transparent layer 2 (parts 52 of the first transparent layer) is formed from a transparent ink.

The transparent ink may refer to an ink capable of forming a transparent layer having light transmittance greater than or equal to 50% per unit thickness. The light transmittance less than 50% per unit thickness of the transparent layer may unintendedly block the transmission of light. This may be a drawback that fails to exhibit a desired color tone of the shaped article by way of the subtractive color mixture. Preferably is used an ink having light transmittance greater than or equal to 80% per unit thickness of the transparent layer. Further, an ink having light transmittance greater than or equal to 90% per unit thickness of the transparent layer is particularly preferable.

By interposing the first transparent layer 2 (part 52 of the first transparent layer) between the light reflective layer 1 (part 51 of the light reflective layer) and the colored layer 3 (part 53 of the colored layer), intermixing of the coloring inks of the colored layer 3 and the ink of the light reflective layer 1 may be avoidable. Even if the coloring inks applied to form the colored layer are mixed with the transparent ink of the first transparent layer, intermixing of these inks may not adversely affect colors of the colored layer or cause any undesirable change to the color tone. Therefore, the resulting shaped article exhibits a desired color tone (decorated as desired) expressed by the colored layer 3.

The width of the part 52 of the first transparent layer from the outer peripheral side to the center side (hereinafter, referred to as the thickness of the first transparent layer) is between 5 µm and 20 µm at the least in a decorated portion on a surface perpendicular to the layer-stacked direction. The width in this disclosure may include but is not limited to the range of values.

[5] Structure of Colored Layer 3 (Part 53 of Colored Layer)

The colored layer 3 (part 53 of the colored layer) is formed from a colorant-containing coloring ink.

Examples of the colorant-containing inks (hereinafter may be referred to as coloring ink) may include but are not limited to yellow (Y), magenta (M), cyan (C), black (K), and pale color inks. Further, red (R), green (G), blue (B), and orange (Or) color inks may be additionally used. Other usable inks may include metallic, pearl, and phosphor inks. One or more than one of these coloring inks may preferably be used to express a desired color tone.

The amounts of the coloring inks to form the colored layer 3 (parts 53 of the colored layer) may be variable depending on a desired (desirably expressed) color tone. In case the coloring inks alone are used to express a bright color tone at a relatively low concentration, the ink density of the colored layer 3 may fail to meet a predetermined ink density. This may generate irregularities in the Z direction and/or ink-less dented parts at positions along the X-Y direction. In any case, the shaped article forming by the multilayer lamination technique, as described in this embodiment, may consequently have an irregular, unattractive shape, which is desirably avoided. In case one cross-sectional surface of the colored layer 3 has the ink density of two lateral and two vertical ink droplets; four ink droplets in total, formed by the error diffusion method on a vertical mold surface near the mid position of the multilayered structure illustrated in FIG. 2, the coloring inks each form four ink droplets at the most (largest concentration) and no ink droplet at the least (zero concentration, meaning colorless). The number of ink droplets being zero may leave an unfilled space as large as four ink droplets, significantly degrading the shaped article in view of its shape and color tone.

This embodiment, therefore, fills the ink density of the colored layer 3 (part 53 of the colored layer) using a supplementary ink in parts of the colored layer 3 (part 53 of the colored layer) in which the coloring inks alone are insufficient to meet a predetermined ink density. Specifically, the colored layer 3 (parts 53 of the colored layer) is formed at a constant total density (number of ink droplets) of the coloring inks and the supplementary ink. This may successfully prevent the formation of dented parts, allowing the shaped article 50 to be elaborately shaped.

The amounts of the coloring inks to be discharged and their landing positions are known beforehand, based on which the amount and position (landing position) of the supplementary ink to be additionally discharged may be suitably determined. The amount and position may be decided by an inkjet head device 10 or by a controller not illustrated in the drawings.

Having the ink density filled by the supplementary ink may allow a surface formed by the colored layer 3 to be flattened, imparting glossiness to the surface.

The supplementary ink may be any ink unless it adversely affects the color tone to be expressed by the colored layer 3 (parts 53 of the colored layer). An example of the supplementary ink may be the transparent ink used to form the first transparent layer 2 (parts 52 of the first transparent layer) and the second transparent layer 4 (parts 54 of the first transparent layer).

The thickness of the colored layer 3, i.e., the width of the part 53 of the colored layer from the outer peripheral side to the center side illustrated in FIG. 2 (hereinafter, referred to as the thickness of the colored layer 3) may be between 5 µm and 20 µm.

The colored layer 3 described in this embodiment is just an option and may be any decorative layer.

[6] Structure of Second Transparent Layer 4 (Parts 54 of Second Transparent Layer)

The second transparent layer 4 (parts 54 of the second transparent layer) is formed from the same transparent ink as that of the first transparent layer 2 (parts 52 of the first transparent layer). The same transparent ink or different transparent inks may be used to form the second transparent layer 4 and the first transparent layer 2.

The thickness of the second transparent layer 4, i.e., the width of the part 54 of the second transparent layer from the outer peripheral side to the center side illustrated in FIG. 2 (hereinafter, referred to as the thickness of the second transparent layer 4) may be between 10 µm and 100 µm.

The second transparent layer 4 functions as a protective layer for the colored layer 3. In this disclosure that employs the multilayer lamination technique (this embodiment), the second transparent layer 4 may also advantageously contribute to elaborateness of the shaped article.

Supposing that the colored layer 3 is the outermost layer of the shaped article 50, i.e., the parts 53 of the colored layer are located at the farthest ends of the respective layers 50a illustrated in FIG. 2, the colored layer 3 (parts 53 of the colored layer) formed may not be as accurate as expected. On the other hand, the shaped article 50 whose outermost layer is the second transparent layer 4 (parts 54 of the second transparent layer), as described in this embodiment, may ensure the accuracy of the colored layer 3 (parts 53 of the colored layer). Thus, the second transparent layer 4 (parts 54 of the second transparent layer) may greatly contribute to a desired color tone.

Another disadvantage in case the colored layer 3 is the outermost layer of the shaped article 50 is that the exposed colored layer 3 may be prone to decolorization under friction and color fading by exposure to ultraviolet. However, as described in this embodiment, the shaped article 50 whose outermost layer is the second transparent layer 4 (parts 54 of the second transparent layer) may prevent such unfavorable events as decolorization and color fading.

[7] Manufacturing Method for Shaped Article

Figure 3:
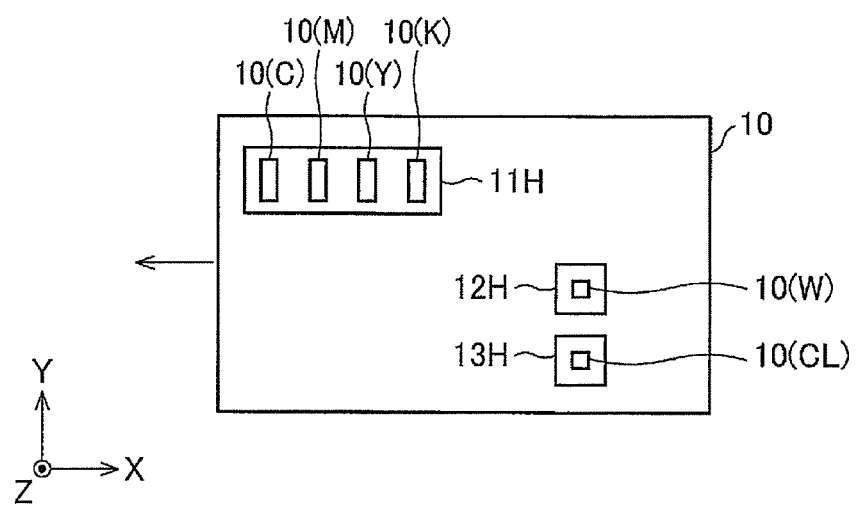
FIG. 3 is a schematic drawing of inkjet heads used in manufacturing of the shaped article of FIG. 1, illustrating a surface where nozzle holes are located.
Figure 4:
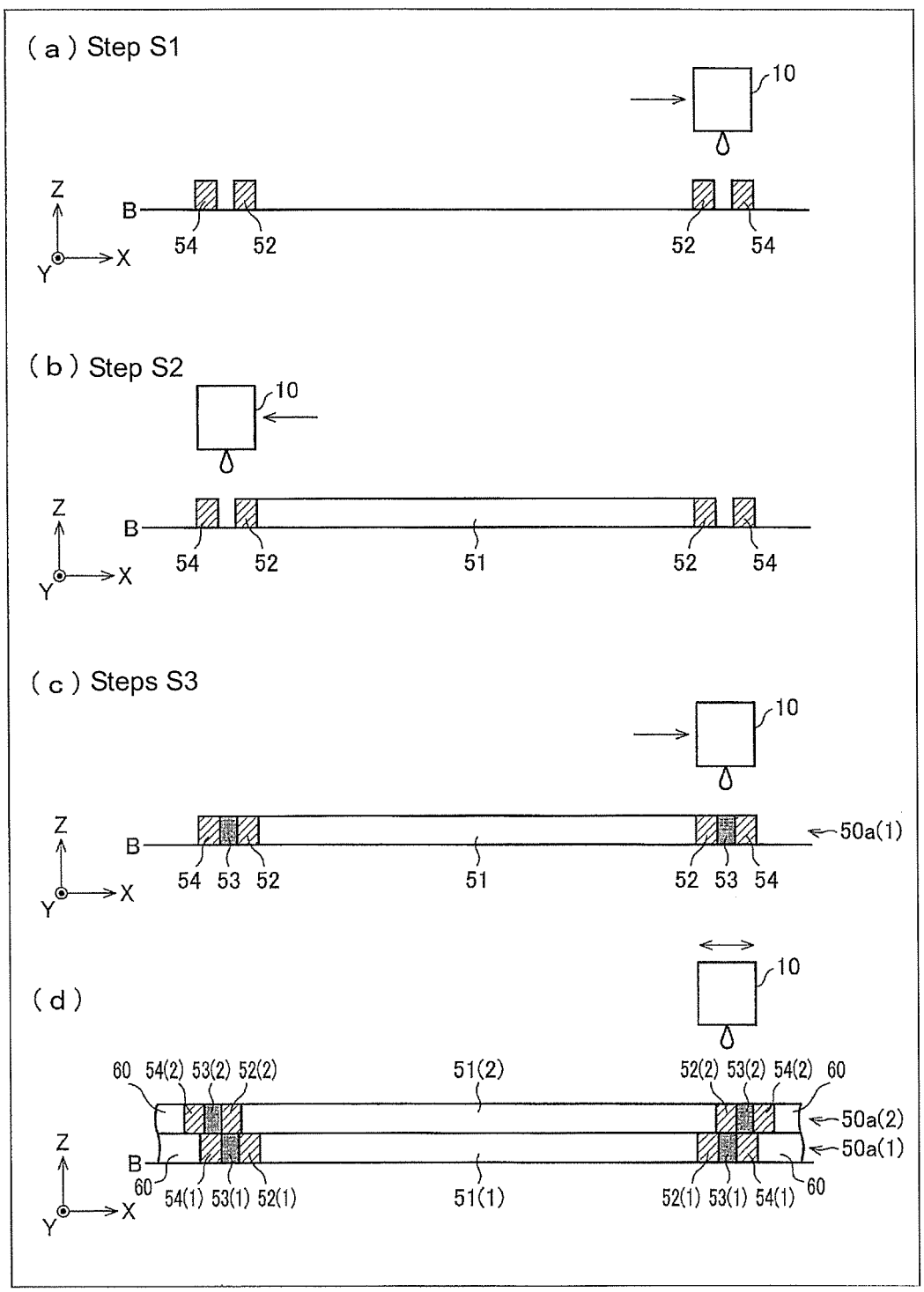
FIG. 4 shows drawings of manufacturing steps for the shaped article of FIG. 1.

A manufacturing method for the shaped article 50 according to this embodiment is hereinafter described. FIG. 3 is a drawing of the lower surface of the inkjet head device 10 used in the manufacturing method. FIG. 4 shows schematic drawings of ongoing steps of manufacturing the shaped article 50 according to this embodiment.

The inkjet head device 10 has, on its lower surface, roughly three inkjet heads 11H to 13H. As illustrated in FIG. 3, the first inkjet head 11H, second inkjet head 12H, and third inkjet head 13H are displaced from one another in the X direction. As illustrated in FIG. 3, the first inkjet head 11H, second inkjet head 12H, and third inkjet head 13H are also displaced from one another in the Y direction. Thus, the inkjet heads 11H to 13H are positioned in, generally called, staggered arrangement.

The first inkjet head 11H has a cyan ink nozzle 10 (C) for discharging a cyan ink, a magenta ink nozzle 10 (M) for discharging a magenta ink, a yellow ink nozzle 10 (Y) for discharging a yellow ink, and a black ink nozzle 10 (K) for discharging a black ink. The number and the order of arrangement of the nozzles 10 (C), 10 (M), 10 (Y), and 10 (K) are not limited to the example illustrated in FIG. 3. All of the inks discharged through these nozzles are coloring inks used to form the colored layer 3 (parts 53 of the colored layer) illustrated in FIG. 2.

The second inkjet head 12H has a white ink nozzle 10 (W) for discharging a white ink (W). The white ink (W) is an ink used to form the light reflective layer 1 (parts 51 of the light reflective layer) illustrated in FIG. 2.

The third inkjet head 13H has a transparent ink nozzle 10 (CL) for discharging a transparent ink (CL). The transparent ink (CL) is an ink used to form the first transparent layer 2 (parts 52 of the first transparent layer) and the second transparent layer 4 (parts 54 of the second transparent layer) illustrated in FIG. 2.

The inkjet head device 10 is located so as to have its lower surface illustrated in FIG. 3 face the layer 50a currently being formed. The inkjet head device 10 is configured to reciprocate in the X direction and discharge the inks while moving in the direction. The inkjet head device 10 is moved in a predetermined direction in an XYZ coordinate system, or a table with the layers 50a placed thereon (FIG. 4 shows a layer formation surface B of the table) is moved in a predetermined direction in the XYZ coordinate system to change relative positions of the inkjet head device 10 and the layer 50a currently being formed. Which one of them should be moved may be optionally decided.

Each of the inks is an ink of ultraviolet curing type that needs to be irradiated with ultraviolet light after being discharged. An ultraviolet irradiator may be mounted in the inkjet head device 10 or may be installed as a separate device. The inks are cured by being irradiated with ultraviolet light to form the layers 50a illustrated in FIG. 2.

The manufacturing process for the shaped article 50 using the inkjet head device 10 is hereinafter described referring to FIG. 4.

To start with, a first one of the layers 50a (first layer 50a (1)) is formed on the layer formation surface B of the table.

In the step of forming (manufacturing) the first layer 50a (1), by using the inkjet printing technique, the respective inks are discharged from the inkjet head device 10 at predetermined timings to form a part of the second transparent layer, a part of the colored layer, a part of the first transparent layer, and a part of the light reflective layer in the mentioned order from the end side toward the center side of the first layer 50a.

The steps of forming (manufacturing) the first layer 50a (1) are described in further detail referring to (a)~(c) of FIG. 4.

In step S1 illustrated in (a) of FIG. 4, the part 54 of the second transparent layer is formed from the transparent ink, and the part 52 of the first transparent layer is formed from the transparent ink. In this step, the inkjet head device 10 is moved in a positive direction along the X axis, and the transparent ink is discharged at a predetermined timing through the transparent ink nozzle 10 (CL) illustrated in FIG. 3. The discharged ink lands on a position at which the part 54 of the second transparent layer should be formed and a position at which the part 52 of the first transparent layer should be forming. Then, the discharged ink pooled at the respective positions is irradiated with ultraviolet light to be cured. As a result, the part 52 of the first transparent layer and the part 54 of the second transparent layer are formed as illustrated in (a) of FIG. 4.

In step S2 illustrated in (b) of FIG. 4, the inkjet head device 10 is moved in a negative direction along the X axis, and the white ink (W), which is the light reflective ink, is discharged at a predetermined timing through the white ink nozzle 10 (W). Then, the discharged ink pooled there is irradiated with ultraviolet light to be cured. As a result, the part 51 of the light reflective layer is framed as illustrated in (b) of FIG. 4.

In step S3 illustrated in (c) of FIG. 4, the inkjet head device 10 is moved in the positive direction along the X axis, and the colored layer forming inks including the coloring inks and the supplementary ink are discharged at a predetermined timing so that the total amount of these inks discharged is constant, and then irradiated with ultraviolet light. The predetermined timing refers to a timing at which the nozzles of the first inkjet head 11H are located at positions at which the colored layer forming inks are dischargeable in a region between the part 52 of the first transparent layer and the part 54 of the second transparent layer formed in step S1. The ink droplets in a predetermined amount are discharged by inkjet printing technique at this timing to form a pool of ink. Then, the pooled ink is irradiated with ultraviolet light to be cured. This forms the part 53 of the colored layer exhibiting a desired color tone between the part 52 of the first transparent layer and the part 54 of the second transparent layer as illustrated in FIG. 4.

As a result of steps S1 to S3, the formation of the first layer 50a (1) is completed. The first layer 50a (1) has the same structure as illustrated in the upper view of the layer 50a in FIG. 5. Optionally, step 1 and step 2 may be performed in the reversed order. Likewise, step S2 and step S3 may be performed in the reversed order.

After the first layer 50a (1) is formed, a new layer 50a (second layer 50a (2)) is formed on the first layer 50a (1) (laminate of layers).

In the shaped article 50 according to this embodiment, the layers 50a stacked on one another are progressively increased in size (area) from the bottom toward the mid stage of the multilayered body as illustrated in FIG. 2. In the shaped article 50 manufactured in such a shape that increases in size along the layer-stacked direction when viewed in cross section, the end of one layer 50a is sticking out sideways further than the end of another layer 50a already formed below the one layer 50a. To form the layers 50a thus characterized, support material layers may preferably be formed.

In FIG. 4, (d) is a drawing of the step of forming the second layer 50a (2). Referring to this drawing, a part 53 (2) of the colored layer in the second layer 50a (2) is formed so as to overlap a part 54 (1) of the second transparent layer in the first layer 50a (1). Since the second layer 50a (2) is greater in size (area) along the X-Y plane than the first layer 50a (1), the part 54 (2) of the second transparent layer forming the end of the second layer 50a (2) is sticking out sideways further than the part 54 (1) of the second transparent layer forming the end of the first layer 50a (1). Because of this structure, the ink to be deposited on a part of the layer 50a (2) where the stick-out part should be formed possibly runs off this part and drops downward. To avoid that, a support material 60 is formed on the outer side (on the lateral side) than the part 54 (1) of the second transparent layer in the first layer 50a (1).

The support material 60 may preferably be formed from any ink that can be discharged by inkjet printing technique. The support material 60 should preferably have enough strength not to collapse under the weight of another layer formed thereon. The support material 60 per se will not be left in the finalized shaped article 50. The ink forming the support material 60, therefore, should preferably be selected from inks that can be stripped off afterwards. The ink of the support material 60 may preferably be curable by ultraviolet light (to a degree of cure at which the ink is stripped off in subsequent steps), or may be a water-soluble ink that can be dissolved in water and removed in subsequent steps.

The steps of forming the layers 50a are repeatedly performed in the X and Y directions as many times as required to form one layer, and then repeatedly performed again in the Z direction. As a result, the shaped article 50 illustrated in FIG. 2 is finally obtained. During the steps of forming one layer, the known interlace scan conventionally employed to form two-dimensional images may preferably be performed to obtain a shaped article with less unevenness in shape and favorably decorated.

The shaped article manufacturing method according to this embodiment is further characterized in that the layer forming process includes steps of: forming the part 54 of the second transparent layer using the transparent ink; forming the part 53 of the colored layer using the coloring inks; forming the part 52 of the first transparent layer using the transparent ink; and forming the part 51 of the light reflective layer using the light reflective ink, wherein the step of forming the part 53 of the colored layer is performed subsequent to the step of forming the part 52 of the first transparent layer and the step of forming the part 54 of the second transparent layer to form the part 53 of the colored layer between the part 52 of the first transparent layer and the part 54 of the second transparent layer. When the part 53 of the colored layer is formed, the part 54 of the second transparent layer may serve as the outer moat of the pooled inks to form the colored layer. This may prevent the ink of the colored layer from spreading unintendedly, ensuring a high accuracy of the part 53 of the colored layer.

Figure 6:
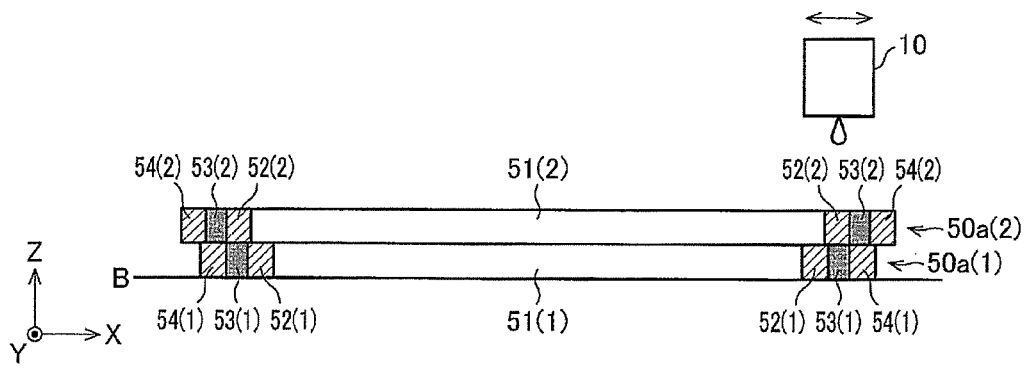
FIG. 6 is a partial cross-sectional view of the shaped article of FIG. 1 illustrated to describe its advantages.
Figure 7:
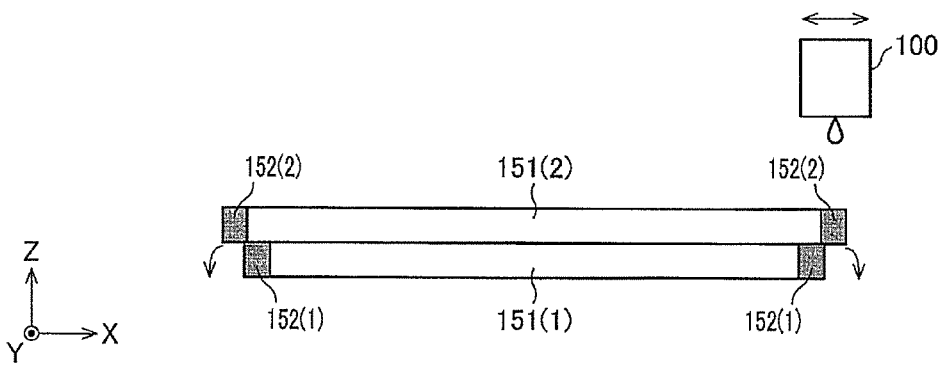
FIG. 7 is a partial cross-sectional view of a shaped article for comparison.

Further benefits delivered by forming the part 54 of the second transparent layer are described referring to FIG. 6 and FIG. 7. FIG. 6 is a drawing of a part of the shaped article 50 according to this embodiment, which is the part of (d) of FIG. 4 from which the support material has been removed. FIG. 7 is a cross-sectional view of a shaped article for comparison. The shaped article for comparison is formed by the multilayer lamination technique similarly to the shaped article 50 according to this embodiment. Unlike the shaped article 50, however, this shaped article lacks parts corresponding to the part 52 of the first transparent layer and the part 54 of the second transparent layer. In this shaped article for comparison, therefore, the light reflective layer is directly coated with the colored layer. Provided that the upper layer is larger in size (area) along the X-Y plane than the lower layer in the shaped article for comparison, problems with this shaped article are described.

In the shaped article for comparison illustrated in FIG. 7, the end of the upper layer includes a colored layer 152 (2). The colored layer 152 (2) is sticking out further than a colored layer 152 (1) formed on the end of the lower layer. This shaped article, therefore, involves the risk that the inks for the colored layer discharged to form the stick-out part run off a coloring position and drop downward.

The colored layer is the deciding factor for the color tone of the shaped article. Therefore, thus losing the inks of the colored layer may cause an intended color tone of the shaped article to change.

On the other hand, the shaped article 50 according to this embodiment illustrated in FIG. 6 has the parts 54 of the second transparent layer at the ends of the layers 50a. The ink applied to form the parts 54 of the second transparent layer, even if it falls downward in FIG. 6, may not adversely affect a color tone desirably expressed because the colored layer is the deciding factor for the color tone. This embodiment may thus successfully manufacture the shaped article 50 that excels in reliability and exhibits a desired color tone.

There are other benefits as well. One of them is, forming the part 54 of the second transparent layer in the first layer 50a (1) allow a larger formation area (formation allowable region) to be secured for the colored layer of the second layer 50a (2). This may help to mitigate a demanded degree of manufacturing accuracy to some extent, conducing to an improved manufacturing efficiency.

The ability to secure a larger formation area is advantageously effective even if the part 54 of the second transparent layer is formed subsequent to the part 53 of the colored layer. This disclosure, therefore, further includes forming the part 54 of the second transparent layer subsequent to the part 53 of the colored layer.

In the shaped article 50 according to this embodiment, the surface of the colored layer 3 is coated with the second transparent layer 4. The second transparent layer 4 thus serves as the protective layer of the colored layer 3.

FIG. 4 illustrates an example in which the upper layer is greater in size (area) along the X-Y plane than the lower layer. This example refers to the lower half of the shaped article 50 of FIG. 1 split in two halves.

The manufacturing method described so far is basically applicable to the upper-half structure of the shaped article 50 of FIG. 1 split in two halves. As for the upper half of the shaped article 50, as illustrated in FIG. 2, the upper colored layer is nearer to the center side of the layer 50a than the lower colored layer, and the parts 53 of the upper colored layer overlap the parts 52 of the lower first transparent layer. Further, the parts 54 of the upper second transparent layer overlap the parts 53 of the lower colored layer.

In the upper half of the shaped article 50, as illustrated in FIG. 2, the lower layers are greater in size (area) along the X-Y plane than the upper layers formed thereon. In this upper-half structure, the ink applied to form the colored layer in the upper layers is very unlikely to drop downward. No support material may be necessary at the time of manufacturing the upper-half structure.

In the shaped article of FIG. 2 according to this embodiment, the bottom layer and layers nearby, and the top layer and layers nearby include: a layer solely having the part 52 of the first transparent layer, part 53 of the colored layer, and part 54 of the second transparent layer; a layer solely having the part 53 of the colored layer and the part 54 of the second transparent layer; and a layer solely having the part 54 of the second transparent layer. This multilayered structure may effectuate a shaped article whose entire surface is covered with the second transparent layer 4, colored layer 3, and first transparent layer 2. This disclosure, however, is not limited to such a multilayered structure. For example, the top and bottom surfaces of the shaped article may include none of the second transparent layer, colored layer, or first transparent layer, as in the multilayered structure of FIG. 9 described later.

[8] Modified Example

First Modified Example

The shaped article 50 according to this embodiment includes the first transparent layer 2, colored layer 3, and second transparent layer 4 that are formed along the surface of the light reflective layer 1. However, this disclosure may include but is not limited to such a structure, and may optionally have a shaped article illustrated in FIG. 8.

In the shaped articles illustrated in (a)~(d) of FIG. 8, the second transparent layer 4 may have a shape described below instead of the shape along the surface of the light reflective layer 1. Because the parts 54 of the second transparent layer constitute the ends of the layers 50a (FIG. 2), the second transparent layer 4 may be formed in an adequate shape that contains therein the shaped article (structure described in the earlier embodiment including the colored layer 3, first transparent layer, and light reflective layer), as illustrated in (a)~(d) of FIG. 8.

Containing the shaped article in the shape formed by the second transparent layer 4, as described in this first modified example, may be useful for any shaped articles that are mechanically fragile. For example, this modified example may be effectively applicable when, for example, molding insects' legs and wings, and stems and petals of flowering plants. When molding organisms and plants in the form of decorative ornaments or specimens, they can be scanned alive by a three-dimensional scanner and released again into the nature when the molding is over. A further benefit may be eco-friendliness because no support material is necessary, producing no waste material.

Figure 8:
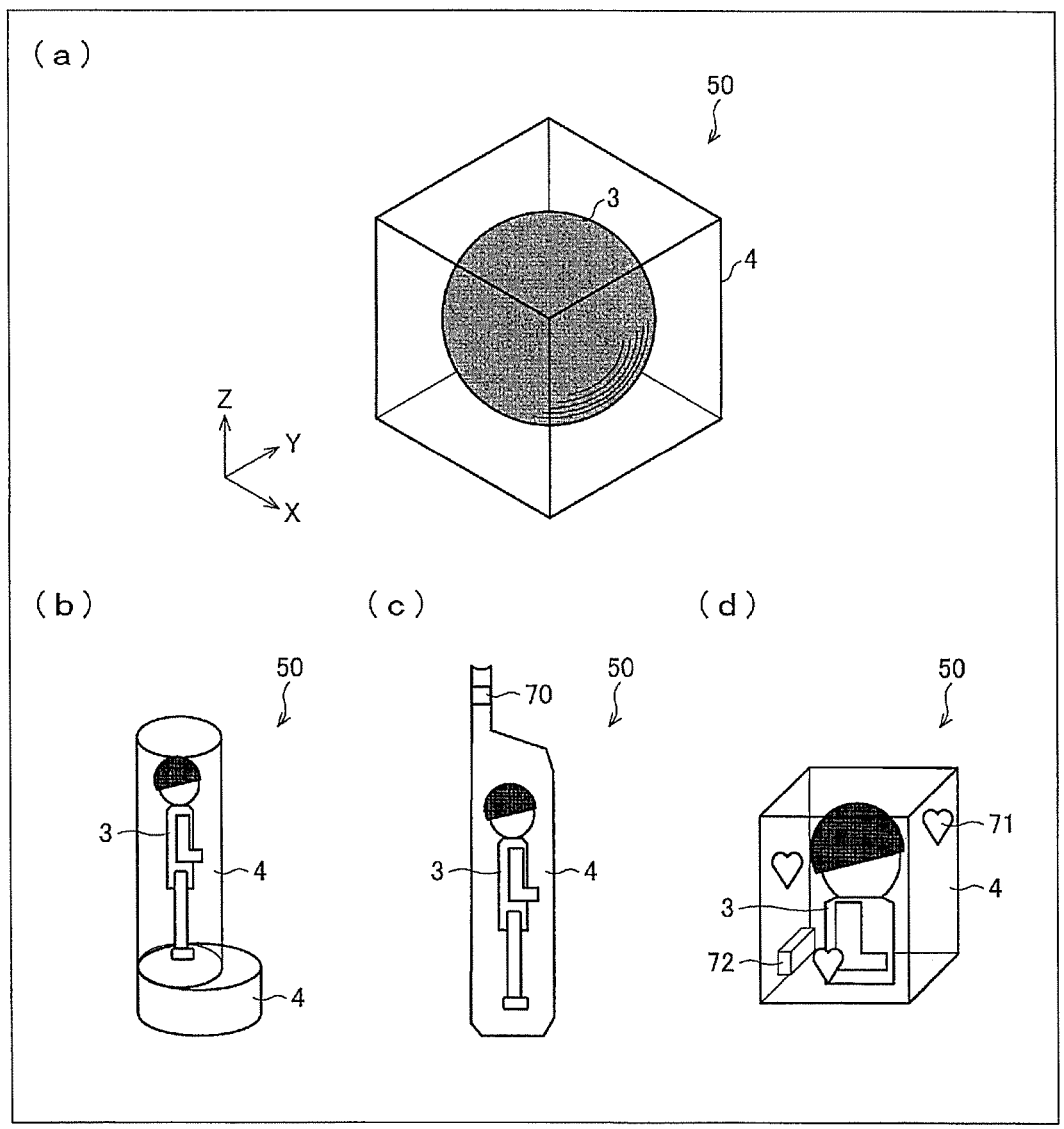
FIG. 8 shows perspective views each illustrating a shaped article disclosed herein according to a modified example.

In the shaped article illustrated in (a) of FIG. 8, the second transparent layer 4 has a hexahedral shape that contains a spherical body including the colored layer 3, first transparent layer, and light reflective layer. The structure illustrated in (a) of FIG. 8 may be obtained by a manufacturing method similar to the method of FIG. 4.

In FIG. 8, (b) illustrates a shaped article 50 of frame-mounted type, wherein a figure including the colored layer 3, first transparent layer, and light reflective layer is contained in the second transparent layer 4. This is a free-standing shaped article 50 supported by the second transparent layer 4. This shaped article 50 of frame-mounted type may be manufactured (fabricated) by the manufacturing method described in the earlier embodiment.

In FIG. 8, (c) illustrates a shaped article 50 for use as a strap, wherein a figure including the colored layer 3, first transparent layer, and light reflective layer is contained in the second transparent layer 4, and a hole 70 is formed in a part of the second transparent layer 4. This may be used as a strap or a key holder attachable to, for example, a mobile telephone. The hole 70 of the second transparent layer 4 may be formed at the same time when the outer shape is formed by the second transparent layer 4. By punching a hole in the second transparent layer 4, the figure including the colored layer 3, first transparent layer, and light reflective layer can avoid being damaged with a hole.

In the shaped article 50 illustrated in (d) of FIG. 8, the upper-half of a figure's body including the colored layer 3, first transparent layer, and light reflective layer is contained in the second transparent layer 4. This article 50 has, on the surface or inside of the second transparent layer 4, a three-dimensional image 71 decorated with a mark or a frame or painted in a pale color. This shaped article 50 further has, on the surface or inside of the second transparent layer 4, a letter/character area 72 with letters and/or characters representing date, name, or place. The decorated three-dimensional image 71 and the letter/character area 72 may be formed at the same time when the outer shape is formed by the second transparent layer 4. Instead of the decorated three-dimensional image 71 and the letter/character area 72, other additional information may be displayed on the surface or inside of the second transparent layer 4.

In (b)~(d) of FIG. 8, one figure is contained in the second transparent layer 4; however, the number of figures containable in the second transparent layer 4 may be other than one.

In case the shaped article according to this embodiment has a ring-like shape, the colored layer may be formed near an inner peripheral end of the ring shape as well as an outer peripheral end thereof. In conclusion, the colored layer may be formed on the surface of the shaped article, and the second transparent layer may be further formed thereon.

Instead of forming the second transparent layer 4 in any desired shape as described in this modified example, the second transparent layer 4 may be formed in a shape suitable for the surface of the light reflective layer 1 similarly to the earlier embodiment. In that case, the obtained shaped article may be sealed in an optionally-shaped resin.

Second Modified Example

Figure 9:
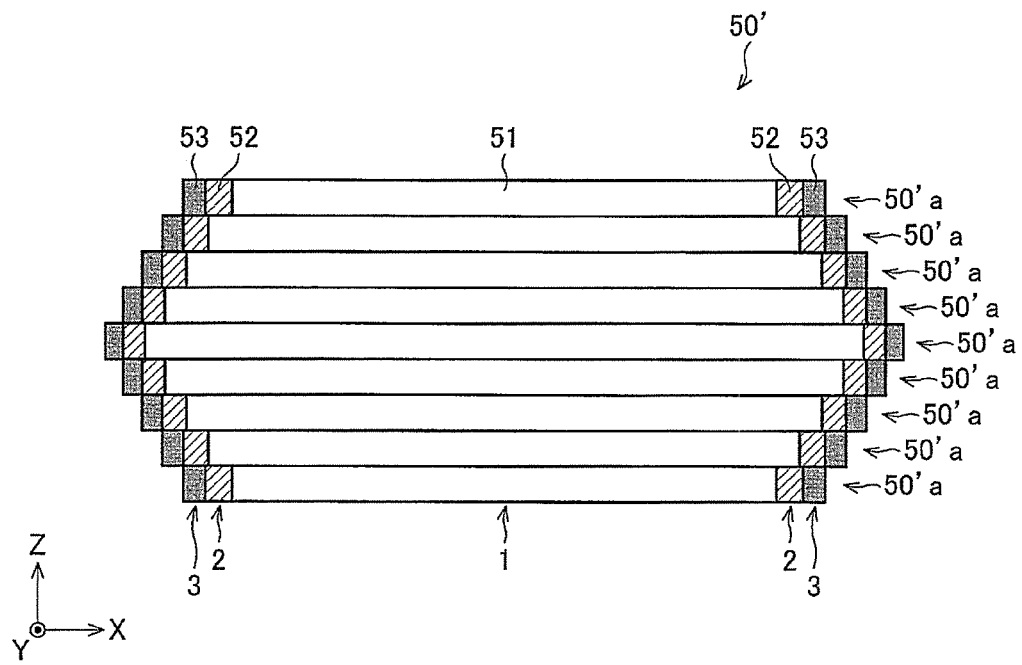
FIG. 9 is a cross-sectional view of a shaped article disclosed herein according to another embodiment.
Figure 10:
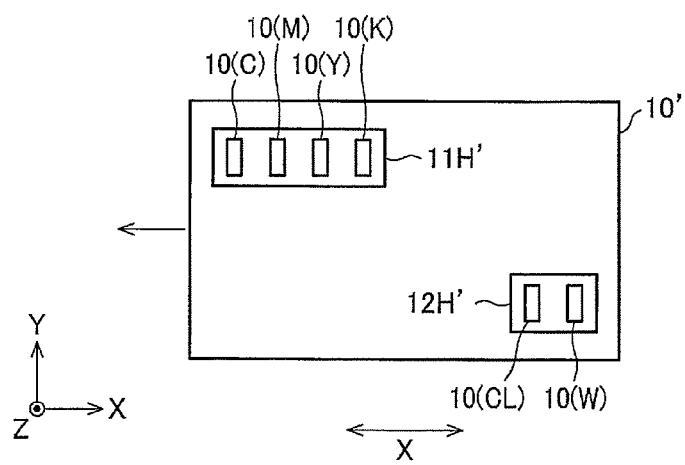
FIG. 10 is a schematic drawing of inkjet heads used in manufacturing of the shaped article of FIG. 9, illustrating a surface where nozzle holes are located.
Figure 11:
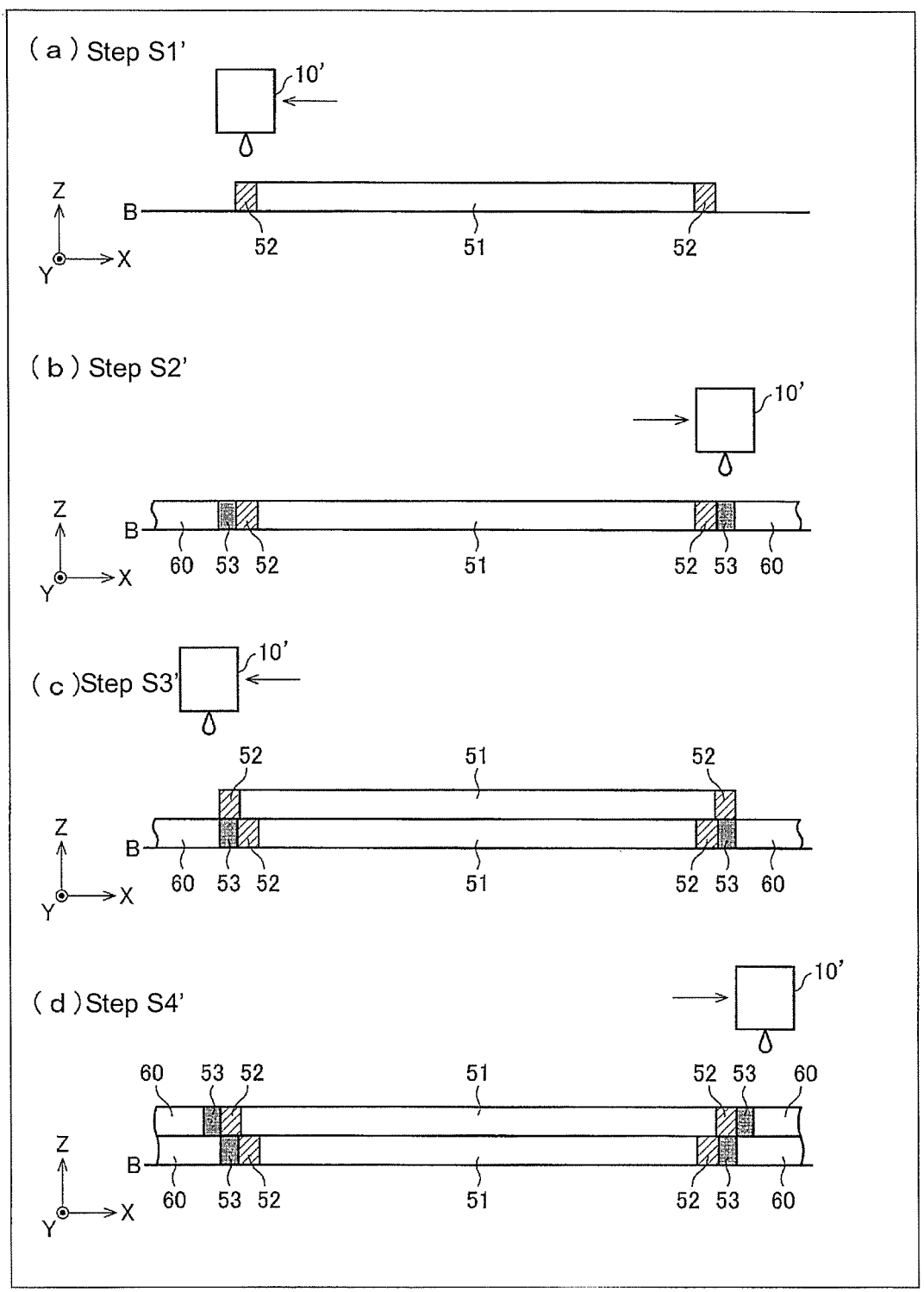
FIG. 11 shows drawings of manufacturing steps for the shaped article of FIG. 9.

The shaped article 50 according to this embodiment has the second transparent layer 4 on its outermost side. This disclosure may achieve its goal in so far as the first transparent layer is interposed between the colored layer and the light reflective layer. This disclosure, therefore, may include, as an embodiment, a shaped article 50' illustrated in cross section in FIG. 9. A second modified example is hereinafter described referring to FIG. 9 to FIG. 11. FIG. 9 is a cross-sectional view of the shaped article 50' according to the second modified example, illustrated similarly to FIG. 2. FIG. 10 is a schematic drawing of the lower surface of an inkjet head device according to the second modified example used in manufacturing of the shaped article 50'. FIG. 11 shows drawings of manufacturing steps for the shaped article 50' according to the second modified example.

A difference between the shaped article 50' according to the second modified example and the shaped article 50 according to the earlier embodiment is that the shaped article 50' according to the second modified example has the colored layer 3 as its outermost layer, unlike the shaped article 50 whose outermost layer is the second transparent layer 4.

Referring to FIG. 9, layers 50'a constituting the shaped article 50' according to the second modified example include no part 54 of the second transparent layer, unlike the layers 50a according to the earlier embodiment (FIG. 2) having these parts 54 at their ends.

In the layers 50'a of the shaped article 50' illustrated in FIG. 9, the parts 52 of the first transparent layer are interposed between the parts 53 of the colored layer and the parts 51 of the light reflective layer. This may prevent the coloring inks applied to form the parts 53 of the colored layer from blending into the ink of the parts 51 of the light reflective layer. Even if the coloring inks of the part 53 of the colored layer are mixed with the transparent ink of the part 52 of the first transparent layer, intermixing of these inks may cause no undesirable change to the color tone of the part 53 of the colored layer. Therefore, the resulting shaped article exhibits a desired color tone expressed by the colored layer.

A manufacturing method for the shaped article 50' of FIG. 9 is hereinafter described. The shaped article 50' of FIG. 9 may be manufactured by an inkjet head device 10' illustrated in FIG. 10.

The inkjet head device 10' illustrated in FIG. 10 has, on its lower surface, roughly two inkjet heads 11H' and 12H'. As illustrated in FIG. 10, the first inkjet head 11H' and the second inkjet head 12H' are displaced from each other in both of the X and Y directions.

The first inkjet head 11H' is the same as the first inkjet head 11H illustrated in FIG. 3.

The second inkjet head 12H' includes a white ink nozzle 10 (W) for discharging a white ink (W) used to form the light reflective layer 1 (parts 51 of the light reflective layer), and a transparent ink nozzle 10 (CL) for discharging a transparent ink (CL).

The steps of manufacturing the shaped article 50' using the inkjet head device 10' are hereinafter described referring to FIG. 11.

In step S1' illustrated in (a) of FIG. 11, the part 52 of the first transparent layer is formed from the transparent ink, and the part 51 of the light reflective layer is formed from the white ink (W). In this step, the inkjet head device 10' is moved in a negative direction along the X axis, and the transparent ink is discharged at a predetermined timing through the transparent ink nozzle 10 (CL), and the white ink (W) is discharged at a predetermined timing through the white ink nozzle 10 (W). The discharged inks land on a position at which the part 52 of the first transparent layer should be formed and a position at which the part 51 of the light reflective layer should be formed. Then, the discharged inks pooled at the respective positions are irradiated with ultraviolet light to be cured. As a result, the part 52 of the first transparent layer and the part 51 of the light reflective layer are formed as illustrated in (a) of FIG. 11.

In step S2' illustrated in (b) of FIG. 11, the inkjet head device 10' is moved in a positive direction along the X axis, and the colored layer forming inks including the coloring inks are discharged at a predetermined timing to land on a position at which the part 53 of the colored layer should be formed. Then, the discharged ink pooled at the position is irradiated with ultraviolet light to be cured.

As a result of steps S1' and S2', the formation of a layer 50'a is completed. The support material 60 described in the earlier embodiment is formed in the second modified example as well.

After the layer 50'a illustrated in (b) of FIG. 11 is formed, a new layer 50'a is formed on the layer 50'a of (b) of FIG. 11 in steps similar to steps S1' and S2'.

Specifically, step S3' illustrated in (c) of FIG. 11 forms the part 52 of the first transparent layer and the part 51 of the light reflective layer in a manner similar to step S1'. In step S3', the upper layer 50'a needs to be formed in a greater size (area) along the X-Y plane than the lower layer 50'a, as described in the earlier embodiment. To this end, as illustrated in (c) of FIG. 11, the transparent ink is discharged so that the part 52 of the first transparent layer in the upper layer 50'a overlaps the part 53 of the colored layer in the lower layer 50'a already formed by the time when step S2' is completed. At the same time, the white ink (W) is discharged and pooled so that the part 51 of the light reflective layer in the upper layer 50'a overlaps the part 51 of the light reflective layer and the part 52 of the first transparent layer in the lower layer 50'a. Then, the pooled ink is irradiated with ultraviolet light to be cured.

In step S4' illustrated in (d) of FIG. 11, the colored layer forming inks are discharged at a predetermined timing in a manner similar to step S1' to land on a position at which the part 53 of the colored layer should be formed and pooled at the position. The predetermined timing refers to a timing of discharging the colored layer forming inks on the outer side of the part 52 of the first transparent layer in the upper layer 50'a with no overlap with the part 53 of the colored layer in the lower layer 50'a. The pooled ink is irradiated with ultraviolet light and thereby cured. Then, the part 53 of the colored layer in the upper layer 50'a is formed.

By repeatedly forming and stacking the layers 50'a on one another, the shaped article 50' illustrated in FIG. 9 may be manufactured.

Third Modified Example

In the embodiment described earlier, the shaped article 50 is manufactured by the inkjet head device 10 illustrated in FIG. 3. In the second modified example, the shaped article 50' is manufactured by the inkjet head device 10' illustrated in FIG. 10. Instead of these inkjet head devices, inkjet head devices illustrated in FIG. 12 to FIG. 14 may be used.

Figure 12:
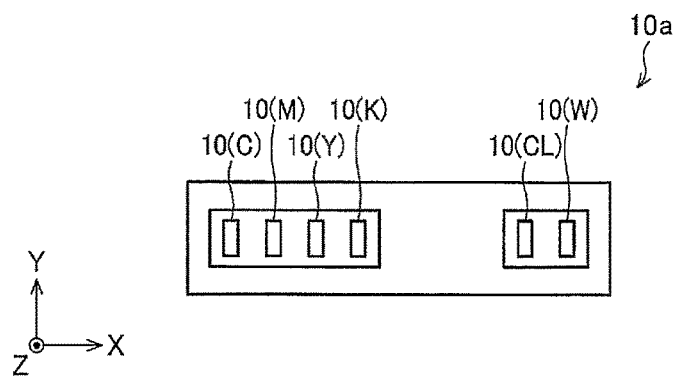
FIG. 12 is a schematic drawing of another example of inkjet heads used in manufacturing of the shaped article disclosed herein.

FIG. 12 is a drawing of a modified example of the inkjet head device, illustrated similarly to FIG. 3 and FIG. 10. In an inkjet head device 10a illustrated in FIG. 12, a cyan ink nozzle 10 (C), a magenta ink nozzle 10 (M), a yellow ink nozzle 10 (Y), a black ink nozzle 10 (K), a white ink nozzle 10 (W), and a transparent ink nozzle 10 (CL) are arranged in the mentioned order in the X direction.

Figure 13:
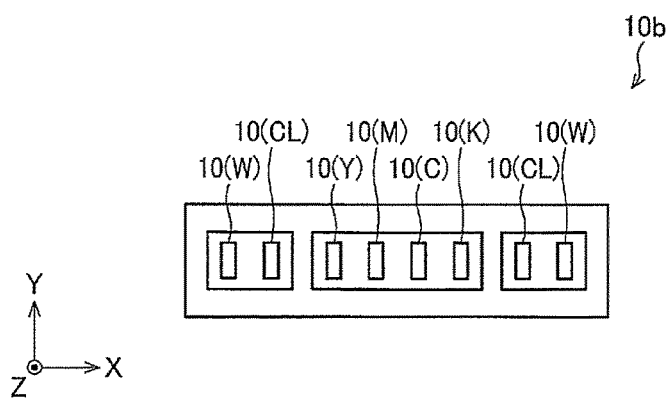
FIG. 13 is a schematic drawing of yet another example of inkjet heads used in manufacturing of the shaped article disclosed herein.

FIG. 13 is a drawing of another modified example of the inkjet head device, illustrated similarly to FIG. 3 and FIG. 10. In an inkjet head device 10b illustrated in FIG. 13, a white ink nozzle 10 (W), a transparent ink nozzle 10 (CL), a yellow ink nozzle 10 (Y), a magenta ink nozzle 10 (M), a cyan ink nozzle 10 (C), a black ink nozzle 10 (K), a transparent ink nozzle 10 (CL), and a white ink nozzle 10 (W) are arranged in the mentioned order in the X direction.

Figure 14:
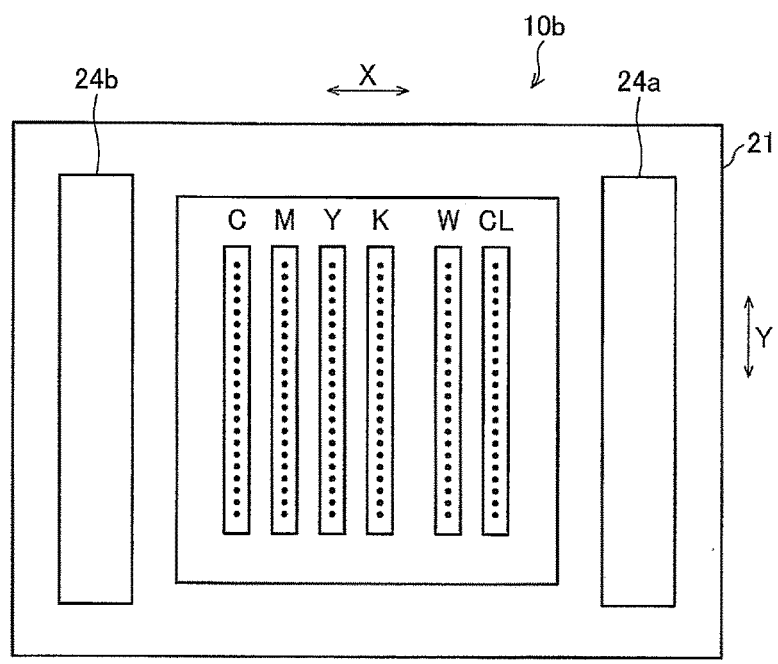
FIG. 14 is a schematic drawing of yet another example of inkjet heads used in manufacturing of the shaped article disclosed herein.

FIG. 14 is a drawing of yet another modified example of the inkjet head device. An inkjet head device 10b illustrated in FIG. 14 has a carriage 21 allowed to reciprocate along the X axis, a plurality of nozzle arrays mounted in the carriage 21, and ultraviolet irradiators 24a and 24b mounted in the carriage 21. The carriage 21 is moved in the Y direction to perform a scan, in which the inks of ultraviolet curing type are discharged from the nozzle arrays and irradiated with ultraviolet light emitted from the ultraviolet irradiators 24a and 24b.

The nozzle arrays are aligned along the X direction as illustrated in FIG. 14. From the left to right in the X direction on the drawing are arranged a cyan ink nozzle array C, a magenta ink nozzle array M, a yellow ink nozzle array Y, a black ink nozzle array K, a white ink nozzle array W, and a transparent ink nozzle array CL are aligned in the mentioned order. Since the nozzle arrays are mounted in the carriage 21, the inks of ultraviolet curing type are dischargeable from these nozzle arrays while moving in the X direction with the carriage 21.

Because all of the nozzles are aligned in the X direction in FIG. 12, FIG. 13, and FIG. 14, the formation of one layer may be completed by moving the nozzles once in the X direction and discharging all of the required ink during the movement. Referring to FIG. 14, all of the inks may be discharged and irradiated with ultraviolet light by moving the nozzles just once in the X direction. This may also be applicable to a layer formed from the inks of ultraviolet curing type, which may be cured as soon as the inks are discharged.

[Additional Remarks]

The shaped article 50 according to one aspect has the first transparent layer 2 formed from the transparent ink between the light reflective layer 1 formed from the light reflective ink and the colored layer 3, wherein the colored layer 3, first transparent layer 2, and light reflective layer 1 are formed in the mentioned order from the outer-layer side toward the inner side of the shaped article 50.

By interposing the first transparent layer 2 between the light reflective layer 1 and the colored layer 3, intermixing of the coloring inks and the underlayer ink, if occurs, may be intermixing of the coloring inks and the transparent ink of the first transparent layer 2, while avoiding intermixing of the coloring inks and the light reflective ink. This may avoid any negative impact on the color tone of the colored layer 3 formed from the coloring inks. The shaped article 50 may accordingly exhibit a color tone as desired.

The shaped article 50 according to one aspect may be more advantageous when a white pigment-containing ink is used to form the light reflective layer 1, because rays of light entering from the outer-layer side of the shaped article may be better reflected by the white pigment-containing ink.

The shaped article 50 according to one aspect further includes the second transparent layer 4 on the outer-layer side of the colored layer 3.

The second transparent layer 4 may serve to protect the colored layer 3 and may also contribute to elaborateness and high accuracy of the shaped article 50.

The shaped article 50 according to one aspect is further characterized in that the colored layer 3 formed has its ink density filled by the transparent ink in parts of the colored layer 3 in which the coloring inks alone are insufficient to meet a predetermined ink density.

By having the ink density of the colored layer 3 filled by the transparent ink, the colored layer 3 may avoid any voids and uneven parts that would otherwise be generated. This may contribute to the formation of an elaborate and very accurate three-dimensional structure.

The shaped article 50 according to one aspect is further characterized in that plural layers 50a, 50'a are stacked on one another, a part of the colored layer 3 (part 53 of the colored layer), a part of the first transparent layer 2 (part 52 of the first transparent layer), and a part of the light reflective layer 1 (part 51 of the light reflective layer) are formed in at least one of the plural layers 50a, 50'a in the mentioned order from the end side toward the center side of the layer.

The shaped article 50 according to one aspect is further characterized in that the second transparent layer 4 is formed on the outer-layer side of the colored layer 3, and a part of the colored layer 3 (part 53 of the colored layer) in at least one of the plural layers 50a, 50'a is interposed between a part of the first transparent layer 2 (part 52 of the first transparent layer) and a part of the second transparent layer 4 (part 54 of the second transparent layer).

The shaped article 50 according to one aspect is further characterized in having a region in which the layers 50a, 50'a are stacked on one another, each layer having a part of the colored layer 3 (part 53 of the colored layer) between a part of the first transparent layer 2 (part 52 of the first transparent layer) and a part of the second transparent layer 4 part 54 of the second transparent layer), and in a portion of the region with no overlap between a part of the colored layer 3 (part 53 of the colored layer) in one of the layers 50a, 50'a and a part of the colored layer 3 (part 53 of the colored layer) in another one of the layers 50a, 50'a on or below the one of the layers 50a, 50'a, there is an overlap between a part of the colored layer 3 (part 53 of the colored layer) in one of the layers 50a, 50'a and a part of the first transparent layer 2 (part 52 of the first transparent layer) or a part of the second transparent layer 4 (part 54 of the second transparent layer) in another one of the layers 50a, 50'a on or below the one of the layers 50a, 50'a.

The manufacturing method for the shaped article 50 according to one aspect is a manufacturing method for the shaped article 50 including the colored layer 3, first transparent layer 2, and light reflective layer 1 formed from the light reflective ink, wherein the colored layer 3, first transparent layer 2, and light reflective layer 1 are formed in this order from the outer-layer side toward the inner side of the shaped article 50. This method employs the multilayer lamination technique to form the layers. Further, the method includes a layer forming process including forming a part of the colored layer 3 (part 53 of the colored layer), a part of the first transparent layer 2 (part 52 of the first transparent layer), and a part of the light reflective layer 1 (part 51 of the light reflective layer) in this order from the end side toward the center side of each one of the layers 50a, 50'a.

By interposing the first transparent layer 2 between the light reflective layer 1 and the colored layer 3, intermixing of the coloring inks and the underlayer ink, if occurs, may be intermixing of the coloring inks and the transparent ink of the first transparent layer 2, while avoiding intermixing of the coloring inks and the light reflective ink. Intermixing of the coloring inks and the transparent ink, if occurs, may not adversely affect a desired color tone. The shaped article 50 may accordingly exhibit a color tone as desired.

The manufacturing method for the shaped article 50 according to one aspect further includes forming the second transparent layer 4 on the outer-layer side of the colored layer 3, wherein the layer forming process includes forming a part of the second transparent layer 4 (part 54 of the second transparent layer) at a position nearer to the end side than a part of the colored layer 3 (part 53 of the colored layer) in each of the layers 50a, 50'a formed.

In the shaped article in which the second transparent layer 4 is formed on the outer-layer side of the colored layer 3, the second transparent layer 4 may serve to protect the colored layer 3 and may also contribute to elaborateness and high accuracy of the shaped article 50.

Specifically, by forming the second transparent layer (part 54 of the second transparent layer) before the colored layer (part 53 of the colored layer) is formed in each of the layers 50a, 50'a, the second transparent layer (part 54 of the second transparent layer) may serve as the outer moat of the colored layer 3 (part 53 of the colored layer). This may prevent the ink forming the colored layer (part 53 of the colored layer) from spreading unintendedly or dropping downward.

In the upper and lower layers 50a, 50'a, the presence of the second transparent layer (part 54 of the second transparent layer) on the lower layer 50a, 50'a may allow a larger formation area to be secured for the colored layer (part 53 of the colored layer) on the upper layer 50a, 50'a. Such an increase of the colored layer formation area may prevent the risk with the layers 50a, 50'a that the coloring inks applied to form the colored layer (part 53 of the colored layer) in one of the layers run off an edge of another one of the layers therebelow, dropping downward. Hence, the shaped article 50 may be successfully manufactured as desired.

The manufacturing method for the shaped article 50 according to one aspect is further characterized in that the layer forming process of forming the layer 50a, 50'a includes steps of: forming a part of the colored layer 3 (part 53 of the colored layer) using the coloring ink; forming a part of the first transparent layer 2 (part 52 of the first transparent layer) using the transparent ink; forming a part of the light reflective layer 1 (part 51 of the light reflective layer) using the light reflective ink; and forming a part of the second transparent layer 4 (part 54 of the second transparent layer) using the transparent ink, wherein the step of forming a part of the colored layer 3 (part 53 of the colored layer) from the coloring inks follows the step of forming a part of the first transparent layer (part 52 of the first transparent layer) and the step of forming a part of the second transparent layer to form a part of the colored layer 3 (part 53 of the colored layer) between a part of the first transparent layer 2 (part 52 of the first transparent layer) and a part of the second transparent layer 4 (part 54 of the second transparent layer).

By forming the first transparent layer (part 52 of the first transparent layer) and the second transparent layer (part 54 of the second transparent layer) before the colored layer (part 53 of the colored layer) is formed, the first transparent layer (part 52 of the first transparent layer) and the second transparent layer (part 54 of the second transparent layer) may serve as the outer moat of the colored layer (part 53 of the colored layer). This may prevent the colored layer (part 53 of the colored layer) from spreading unintendedly. The shaped article 50, therefore, may be successfully manufactured as desired.

The manufacturing method for the shaped article 50 according to one aspect is further characterized in that, in a portion with no overlap between a part of the colored layer 3 (part 53 of the colored layer) in one of the layers 50$a$, 50$'a$ and a part of the colored layer 3 (part 53 of the colored layer) in another one of the layers 50$a$, 50$'a$ on or below the one of the layers 50$a$, 50$'a$, there is an overlap between a part of the colored layer 3 (part 53 of the colored layer) in one of the layers 50$a$, 50$'a$ and a part of the first transparent layer 2 (part 52 of the first transparent layer) or a part of the second transparent layer 4 (part 54 of the second transparent layer) in another one of the layers 50$a$, 50$'a$ on or below the one of the layers 50$a$, 50$'a$.

The colored layer (part 53 of the colored layer) may be interposed also in the layer-stacked direction between the transparent ink layers (part 52 of the first transparent layer and part 54 of the second transparent layer). This may avoid any overlap between parts of the colored layer (parts 53 of the colored layer) in the upper and lower layers 50$a$, 50$'a$. The shaped article 50 thus formed may not exhibit undesirable variability in color tone when viewed in a certain direction and viewed in another direction inclined from the direction.

The manufacturing method for the shaped article 50 according to one aspect is further characterized in forming a part of the decorative layer by filling the ink density of the decorative layer using a transparent supplementary ink in a part of the decorative layer in which decorative inks alone are insufficient to meet a predetermined ink density. Thus, the ink density of the colored layer 3 (part 53 of the colored layer) is filled by the transparent ink.

By having the ink density of the colored layer 3 (part 53 of the colored layer) filled by the transparent ink, the colored layer 3 (part 53 of the colored layer) may avoid any unintended voids and uneven parts that would otherwise be generated. This may contribute to elaborateness and high accuracy of the shaped article 50.

This disclosure is not necessarily limited to the embodiment described so far and may be carried out in many other foul's. The technical scope of this disclosure encompasses any modifications within its scope defined by the appended claims and embodiments obtained by variously combining the technical means disclosed herein. By variously combining the technical means disclosed in the embodiment and modified examples, additional technical features may be further presented.

Second Embodiment

The inventors of this application found a problem with the known inkjet 3D molding. The problem is, irregularities and/or voids were generated in layers formed from the decorative inks (coloring inks of, for example, yellow, magenta, cyan, and black inks) when these inks and a molding ink were discharged by inkjet printing technique.

They studied what triggered the problem and finally found out that the amounts of decorative inks discharged were variable depending on intended decorative effects, which led to an insufficient ink density of the decorative layer failing to meet a predetermined ink density. As for coloring as an example of decoration (recording of characters and images in colors through subtractive color mixture), it is coloring inks that decide the color tone of a colored layer. Naturally, the amounts of coloring inks discharged may differ from one color tone to another desirably expressed. When the coloring inks are discharged in relatively small amounts, the ink density of the colored layer may fail to meet a predetermined ink density. The inventors were led to the fact that such shortage of the ink density would cause the irregularities and/or voids described earlier. The irregularities and/or voids are desirably avoided because they are likely to impair a color tone to be attained by decoration and adversely affect the whole structure of a shaped article.

To address the issue, this disclosure is directed to providing a shaped article that may be decorated as desired and also shaped as desired, and a manufacturing method for such a shaped article.

To this end, a shaped article disclosed herein is a shaped article formed by multilayer lamination technique, further characterized in that the shaped article has a decorative layer, and the decorative layer has its ink density filled by a supplementary ink in parts of the decorative layer in which decorative inks alone are insufficient to meet a predetermined ink density.

By forming the decorative layer using the decorative inks alone, the ink density of the decorative layer may be partly insufficient, failing to meet a predetermined ink density. This may generate irregularities and/or voids in the decorative layer. The irregularities and/or voids may incur failure to obtain any desired shape of the shaped article in the manufacturing process. On the other hand, the shaped article characterized as described herein may eliminate the risk of such irregularities and/or voids because the ink density of the decorative layer is filled by the supplementary ink. The shaped article, therefore, may be successfully decorated as desired and also shaped as desired.

The shaped article disclosed herein according to an aspect is further characterized in that the supplementary ink includes a transparent ink.

Using the transparent ink may be unlikely to adversely affect decorative effects expected for the decorative layer, thereby successfully providing a shaped article decorated as desired.

A manufacturing method for a shaped article disclosed herein is a manufacturing method that employs multilayer lamination technique to form a shaped article having a decorative layer, further characterized in that the decorative layer has its ink density filled by a supplementary ink in parts of the decorative layer in which decorative inks alone are insufficient to meet a predetermined ink density.

By forming the decorative layer using the decorative inks alone, the ink density of the decorative layer may be partly insufficient, failing to meet a predetermined ink density. This may generate irregularities and/or voids in the decorative layer. The irregularities and/or voids may incur failure to obtain any desired shape of the shaped article in the manufacturing process. This method, on the other hand, may eliminate the risk of such irregularities and/or voids because the ink density of the decorative layer is filled by the supplementary ink. The shaped article, therefore, may be successfully decorated as desired and also shaped elaborately.

The shaped article manufacturing method disclosed herein is further characterized in including a layer forming process including forming layers each having a part of the decorative layer, in which one of the layers is newly formed on another one of the layers so that the parts of the decorative layer in these layers are continuous and thereby form the decorative layer, and the layer forming process further includes filling the ink density of the decorative layer using a supplementary ink in parts of the decorative layer in which decorative inks alone are insufficient to meet a predetermined ink density.

This method fills the ink density of the decorative layer in parts of the decorative layer formed by the layer forming process. This method thus advantageous may successfully form layers with neither irregularity nor void.

This disclosure provides a shaped article that may be decorated as desired and also shaped as desired, and a manufacturing method for such a shaped article.

An embodiment of a shaped article and a shaped article manufacturing method disclosed herein is hereinafter described referring to FIG. 1 to FIG. 8. The shaped article disclosed herein has a three-dimensional structure constructed of a laminate of layers (formed by multilayer lamination technique). In the embodiment hereinafter described, inkjet printing technique is employed to manufacture the shaped article. This is, however, just an option presented in this disclosure. This disclosure may be applicable to any kinds of manufacturing methods that can obtain a shaped article by leveraging the multilayer lamination technique and decorate its surface (recording of characters and images in colors).

[1] Structure of Shaped Article

FIG. 1 is a perspective view of an outer shape of a shaped article 50 according to an embodiment. The shaped article 50 according to this embodiment has a substantially cylindrical shape with a curved side surface bulging outward. The shaped article disclosed herein and the shaped article manufactured by the manufacturing method disclosed herein may not be limited to the shape illustrated in FIG. 1. There are many other examples of the shape, including a hexahedral shape described later, a spherical shape, a hollow structure, a ring-like shape, and a horseshoe-like shape.

The shaped article 50 according to this embodiment includes a second transparent layer, a colored layer (decorative layer) formed from colorant-containing inks (decorative ink), a first transparent layer formed from a transparent ink, and a light reflective layer formed from an ink having light reflectiveness, wherein these layers are formed in the mentioned order from an outer-layer side (outer peripheral side) toward an inner side (center) of the shaped article 50. This is a distinctive technical feature of this disclosure. FIG. 1 is a drawing of the shaped article 50. In this drawing, a second transparent layer 4 formed from a transparent ink, which is the outermost layer, can be seen on the curved side surface of the shaped article 50.

FIG. 2 is a cross-sectional view of the illustration of FIG. 1 taken along a cutting-plane line A-A'. The cross-sectional view of the shaped article 50 illustrated in FIG. 2 is taken at a central position of the shaped article 50 along the X-Z plane of the XYZ coordinate system illustrated in FIG. 1.

The embodiment of FIG. 2 presents an example of the shaped article 50 having a three-dimensional structure formed by stacking 21 layers 50*a* on one another in the Z direction. It should be understood that the shaped article 50 may include less than or more than 21 layers.

[2] Structures of Layers

FIG. 5 is a drawing of the X-Y plane of a layer 50*a* in the vicinity of a mid-stage of the shaped article 50. The layers 50*a* each include a part 54 of the second transparent layer, a part 53 of the colored layer, a part 52 of the first transparent layer, and a part 51 of the light reflective layer. These layers are formed in the mentioned order from an outer peripheral side toward a center side of the shaped article. If the shaped article 50 according to this embodiment is stated another way, the light reflective layer 1, which is the body of the shaped article, is coated with the first transparent layer 2, colored layer 3, and second transparent layer 4 in the mentioned order toward the outer-layer side (outer peripheral side). Each one of the layers 50*a* has a thickness in the Z direction (vertical direction in the drawing) between 5 μm and 50 μm. This is an adequate range of thickness values for multicolor formation of the colored layer 3 using the subtractive color mixture. For example, a preferable range of thickness values is 10 μm to 25 μm when layers are formed from inks of ultraviolet curing type by inkjet printing technique.

In this embodiment, the light reflective layer 1 is the body of the shaped article; however, the light reflective layer may or may not constitute the body of the shaped article. Specifically, the shaped article may have, at its center, a body or a cavity apart from the light reflective layer, wherein the light reflective layer, first transparent layer, colored layer, and second transparent layer are formed in the mentioned order from the body (may or may not have light reflectiveness) toward the outer-layer side (outer peripheral side). Alternatively, a core (may or may not have light reflectiveness) and the light reflective layer 1 formed on a surface of the core may be collectively regarded as the body of the shaped article.

By stacking the layers 50*a* in the Z direction as illustrated in FIG. 2, the parts 54 of the second transparent layer in the respective layers 50*a* are substantially continuous in a direction along the outermost surface of the shaped article 50, forming the second transparent layer 4. The parts 53 of the colored layer in the respective layers 50*a* are substantially continuous in the direction along the outermost surface of the shaped article 50, forming the colored layer 3. The parts 52 of the first transparent layer in the respective layers 50*a* are substantially continuous in the direction along the outermost surface of the shaped article 50, forming the first transparent layer 2. The parts 51 of the light reflective layer in the respective layers 50*a* are substantially continuous in the direction along the outermost surface of the shaped article 50, forming the light reflective layer 1.

Looking at, in any of the X, Y, and Z directions, the outer surface of the shaped article 50 including the second transparent layer, colored layer, first transparent layer, and light reflective layer arranged in the mentioned order, a color tone produced by the subtractive color mixture may be visually recognized.

The parts 52 of the first transparent layer may preferably have a dimension in the direction of X-Y plane slightly greater than the part 53 of the colored layer vertically in contact with the parts 52. This may more reliably prevent intermixing of the inks forming the colored layer 3 and the light reflective layer 1.

The parts 54 of the second transparent layer may preferably have a dimension in the direction of X-Y plane slightly greater than the parts 53 of the colored layer vertically in contact with the parts 54 of the second transparent layer. This may provide for better protection of the colored layer 3.

The width of the shaped article 50 along the Z direction (hereinafter may be referred to as thickness or height in the Z direction) is not particularly limited. The thickness (height) of the layer 50a in the Z direction may be optionally decided depending on the number of layers. As described later, this embodiment constructs the multilayered structure using the inkjet printing technique. Therefore, any feasible values in the technique should be contemplated for the thickness of the layer 50a in the Z direction. When inks of ultraviolet curing type are applied by inkjet printing technique to form the layers (described later), the layer 50a may have a thickness ranging from 5 µm to 20 µm depending on the sizes of ink droplets. As for a large-sized shaped article for which a high resolution is not particularly required, plural layers may be formed based on the same data simply by increasing the sizes of ink droplets. In such a case, a smaller data volume and a higher molding rate may be anticipated.

[3] Structure of Light Reflective Layer 1 (Parts 51 of Light Reflective Layer)

The light reflective layer 1 (parts 51 of the light reflective layer) is a layer formed from a light reflective ink. This layer, therefore, has light reflectiveness that allows rays of light in the whole visible light region to be reflected on at least the surface of the light reflective layer 1 in contact with the colored layer.

Specific examples of ink of the light reflective layer 1 (parts 51 of the light reflective layer) may include metallic powder-containing inks and white pigment-containing inks. The light reflective layer 1 may preferably be formed from a white ink. The light reflective layer 1 formed from a white ink may adequately reflect rays of light entering from the outer-layer side of the shaped article, allowing the shaped article to be colored by the subtractive color mixture.

In this embodiment, the light reflective layer 1 constitutes the body of the shaped article. In case the light reflective layer 1 is formed on the surface of the body of any shaped article for which light reflectiveness is not required, the thickness of the light reflective layer 1, i.e., the width of the part 51 of the light reflective layer from the outer peripheral side to the center side, as illustrated in FIG. 2, may be between 5 µm and 20 µm at the least. The width in this disclosure may include but is not limited to the range of values.

[4] Structure of First Transparent Layer 2 (Parts 52 of First Transparent Layer)

The first transparent layer 2 (parts 52 of the first transparent layer) is formed from a transparent ink.

The transparent ink may refer to an ink capable of forming a transparent layer having light transmittance greater than or equal to 50% per unit thickness. The light transmittance less than 50% per unit thickness of the transparent layer may unintendedly block the transmission of light. This may be a drawback that fails to exhibit a desired color tone of the shaped article by way of the subtractive color mixture. Preferably is used an ink having light transmittance greater than or equal to 80% per unit thickness of the transparent layer. Further, an ink having light transmittance greater than or equal to 90% per unit thickness of the transparent layer is particularly preferable.

By interposing the first transparent layer 2 (part 52 of the first transparent layer) between the light reflective layer 1 (part 51 of the light reflective layer) and the colored layer 3 (part 53 of the colored layer), intermixing of the coloring inks of the colored layer 3 and the ink of the light reflective layer 1 may be avoidable. Even if the coloring inks applied to form the colored layer are mixed with the transparent ink of the first transparent layer, intermixing of these inks may not adversely affect colors of the colored layer or cause any undesirable change to the color tone. Therefore, the resulting shaped article exhibits a desired color tone (decorated as desired) expressed by the colored layer 3.

The width of the part 52 of the first transparent layer from the outer peripheral side to the center side (hereinafter, referred to as the thickness of the first transparent layer) is between 5 µm and 20 µm at the least in a decorated portion on a surface perpendicular to the layer-stacked direction. The width in this disclosure may include but is not limited to the range of values.

[5] Structure of Colored Layer 3 (Part 53 of Colored Layer)

The colored layer 3 (part 53 of the colored layer) is formed from a colorant-containing coloring ink.

Examples of the colorant-containing inks (hereinafter may be referred to as coloring ink) may include but are not limited to yellow (Y), magenta (M), cyan (C), black (K), and pale color inks. Further, red (R), green (G), blue (B), and orange (Or) color inks may be additionally used. Other usable inks may include metallic, pearl, and phosphor inks. One or more than one of these coloring inks may preferably be used to express a desired color tone.

The amounts of the coloring inks to form the colored layer 3 (parts 53 of the colored layer) may be variable depending on a desired (desirably expressed) color tone. In case the coloring inks alone are used to express a bright color tone at a relatively low concentration, the ink density of the colored layer 3 may fail to meet a predetermined ink density. This may generate irregularities in the Z direction and/or ink-less dented parts at positions along the X-Y direction. In any case, the shaped article formed by the multilayer lamination technique, as described in this embodiment, may consequently have an irregular, unattractive shape, which is desirably avoided. In case one cross-sectional surface of the colored layer 3 has the ink density of two lateral and two vertical ink droplets; four ink droplets in total, formed by the error diffusion method on a vertical mold surface near the mid position of the multilayered structure illustrated in FIG. 2, the coloring inks each form four ink droplets at the most (largest concentration) and no ink droplet at the least (zero concentration, meaning colorless). The number of ink droplets being zero may leave an unfilled space as large as four ink droplets, significantly degrading the shaped article in view of its shape and color tone.

This embodiment, therefore, fills the ink density of the colored layer 3 (part 53 of the colored layer) using a supplementary ink in parts of the colored layer 3 (part 53 of the colored layer) in which the coloring inks alone are insufficient to meet a predetermined ink density. Specifically, the colored layer 3 (parts 53 of the colored layer) is formed at a constant total density (number of ink droplets) of the coloring inks and the supplementary ink. This may successfully prevent the formation of dented parts, allowing the shaped article 50 to be elaborately shaped.

The amounts of the coloring inks to be discharged and their landing positions are known beforehand, based on which the amount and position (landing position) of the supplementary ink to be additionally discharged may be suitably determined. The amount and position may be decided by an inkjet head device 10 or by a controller not illustrated in the drawings.

Having the ink density filled by the supplementary ink may allow a surface formed by the colored layer 3 to be flattened, imparting glossiness to the surface.

The supplementary ink may be any ink unless it adversely affects the color tone to be expressed by the colored layer 3 (parts 53 of the colored layer). An example of the supplementary ink may be the transparent ink used to form the first transparent layer 2 (parts 52 of the first transparent layer) and the second transparent layer 4 (parts 54 of the first transparent layer).

The thickness of the colored layer 3, i.e., the width of the part 53 of the colored layer from the outer peripheral side to the center side illustrated in FIG. 2 (hereinafter, referred to as the thickness of the colored layer 3) may be between 5 µm and 20 µm.

The colored layer 3 described in this embodiment is just an option and may be any decorative layer.

[6] Structure of Second Transparent Layer 4 (Parts 54 of Second Transparent Layer)

The second transparent layer 4 (parts 54 of the second transparent layer) is formed from the same transparent ink as that of the first transparent layer 2 (parts 52 of the first transparent layer). The same transparent ink or different transparent inks may be used to form the second transparent layer 4 and the first transparent layer 2.

The thickness of the second transparent layer 4, i.e., the width of the part 54 of the second transparent layer from the outer peripheral side to the center side illustrated in FIG. 2 (hereinafter, referred to as the thickness of the second transparent layer 4) may be between 10 µm and 100 µm.

The second transparent layer 4 functions as a protective layer for the colored layer 3. In this disclosure that employs the multilayer lamination technique (this embodiment), the second transparent layer 4 may also advantageously contribute to elaborateness of the shaped article.

Supposing that the colored layer 3 is the outermost layer of the shaped article 50, i.e., the parts 53 of the colored layer are located at the farthest ends of the respective layers 50a illustrated in FIG. 2, the colored layer 3 (parts 53 of the colored layer) formed may not be as accurate as expected. On the other hand, the shaped article 50 whose outermost layer is the second transparent layer 4 (parts 54 of the second transparent layer), as described in this embodiment, may ensure the accuracy of the colored layer 3 (parts 53 of the colored layer). Thus, the second transparent layer 4 (parts 54 of the second transparent layer) may greatly contribute to a desired color tone.

Another disadvantage in case the colored layer 3 is the outermost layer of the shaped article 50 is that the exposed colored layer 3 may be prone to decolorization under friction and color fading by exposure to ultraviolet. However, as described in this embodiment, the shaped article 50 whose outermost layer is the second transparent layer 4 (parts 54 of the second transparent layer) may prevent such unfavorable events as decolorization and color fading.

[7] Manufacturing Method for Shaped Article

A manufacturing method for the shaped article 50 according to this embodiment is hereinafter described. FIG. 3 is a drawing of the lower surface of the inkjet head device 10 used in the manufacturing method. FIG. 4 shows schematic drawings of ongoing steps of manufacturing the shaped article 50 according to this embodiment.

The inkjet head device 10 has, on its lower surface, roughly three inkjet heads 11H to 13H. As illustrated in FIG. 3, the first inkjet head 11H, second inkjet head 12H, and third inkjet head 13H are displaced from one another in the X direction. As illustrated in FIG. 3, the first inkjet head 11H, second inkjet head 12H, and third inkjet head 13H are also displaced from one another in the Y direction. Thus, the inkjet heads 11H to 13H are positioned in, generally called, staggered arrangement.

The first inkjet head 11H has a cyan ink nozzle 10 (C) for discharging a cyan ink, a magenta ink nozzle 10 (M) for discharging a magenta ink, a yellow ink nozzle 10 (Y) for discharging a yellow ink, and a black ink nozzle 10 (K) for discharging a black ink. The number and the order of arrangement of the nozzles 10 (C), 10 (M), 10 (Y), and 10 (K) are not limited to the example illustrated in FIG. 3. All of the inks discharged through these nozzles are coloring inks used to form the colored layer 3 (parts 53 of the colored layer) illustrated in FIG. 2.

The second inkjet head 12H has a white ink nozzle 10 (W) for discharging a white ink (W). The white ink (W) is an ink used to form the light reflective layer 1 (parts 51 of the light reflective layer) illustrated in FIG. 2.

The third inkjet head 13H has a transparent ink nozzle 10 (CL) for discharging a transparent ink (CL). The transparent ink (CL) is an ink used to form the first transparent layer 2 (parts 52 of the first transparent layer) and the second transparent layer 4 (parts 54 of the second transparent layer) illustrated in FIG. 2.

The inkjet head device 10 is located so as to have its lower surface illustrated in FIG. 3 face the layer 50a currently being formed. The inkjet head device 10 is configured to reciprocate in the X direction and discharge the inks while moving in the direction. The inkjet head device 10 is moved in a predetermined direction in an XYZ coordinate system, or a table with the layers 50a placed thereon (FIG. 4 shows a layer formation surface B of the table) is moved in a predetermined direction in the XYZ coordinate system to change relative positions of the inkjet head device 10 and the layer 50a currently being formed. Which one of them should be moved may be optionally decided.

Each of the inks is an ink of ultraviolet curing type that needs to be irradiated with ultraviolet light after being discharged. A ultraviolet irradiator may be mounted in the inkjet head device 10 or may be installed as a separate device. The inks are cured by being irradiated with ultraviolet light to form the layers 50a illustrated in FIG. 2.

The manufacturing process for the shaped article 50 using the inkjet head device 10 is hereinafter described referring to FIG. 4.

To start with, a first one of the layers 50a (first layer 50a (1)) is formed on the layer formation surface B of the table.

In the step of forming (manufacturing) the first layer 50a (1), by using the inkjet printing technique, the respective inks are discharged from the inkjet head device 10 at predetermined timings to form a part of the second transparent layer, a part of the colored layer, a part of the first transparent layer, and a part of the light reflective layer in the mentioned order from the end side toward the center side of the first layer 50*a*.

The steps of forming (manufacturing) the first layer 50*a* (1) are described in further detail referring to (a)~(c) of FIG. 4.

In step S1 illustrated in (a) of FIG. 4, the part 54 of the second transparent layer is formed from the transparent ink, and the part 52 of the first transparent layer is formed from the transparent ink. In this step, the inkjet head device 10 is moved in a positive direction along the X axis, and the transparent ink is discharged at a predetermined timing through the transparent ink nozzle 10 (CL) illustrated in FIG. 3. The discharged ink lands on a position at which the part 54 of the second transparent layer should be formed and a position at which the part 52 of the first transparent layer should be formed. Then, the discharged ink pooled at the respective positions is irradiated with ultraviolet light to be cured. As a result, the part 52 of the first transparent layer and the part 54 of the second transparent layer are formed as illustrated in (a) of FIG. 4.

In step S2 illustrated in (b) of FIG. 4, the inkjet head device 10 is moved in a negative direction along the X axis, and the white ink (W), which is the light reflective ink, is discharged at a predetermined timing through the white ink nozzle 10 (W). Then, the discharged ink pooled there is irradiated with ultraviolet light to be cured. As a result, the part 51 of the light reflective layer is formed as illustrated in (b) of FIG. 4.

In step S3 illustrated in (c) of FIG. 4, the inkjet head device 10 is moved in the positive direction along the X axis, and the colored layer forming inks including the coloring inks and the supplementary ink are discharged at a predetermined timing so that the total amount of these inks discharged is constant, and then irradiated with ultraviolet light. The predetermined timing refers to a timing at which the nozzles of the first inkjet head 11H are located at positions at which the colored layer forming inks are dischargeable in a region between the part 52 of the first transparent layer and the part 54 of the second transparent layer formed in step S1. The ink droplets in a predetermined amount are discharged by inkjet printing technique at this timing to form a pool of ink. Then, the pooled ink is irradiated with ultraviolet light to be cured. This forms the part 53 of the colored layer exhibiting a desired color tone between the part 52 of the first transparent layer and the part 54 of the second transparent layer as illustrated in (c) of FIG. 4.

As a result of steps S1 to S3, the formation of the first layer 50*a* (1) is completed. The first layer 50*a* (1) has the same structure as illustrated in the upper view of the layer 50*a* in FIG. 5. Optionally, step 1 and step 2 may be performed in the reversed order. Likewise, step S2 and step S3 may be performed in the reversed order.

After the first layer 50*a* (1) is formed, a new layer 50*a* (second layer 50*a* (2)) is formed on the first layer 50*a* (1) (laminate of layers).

In the shaped article 50 according to this embodiment, the layers 50*a* stacked on one another along the X-Y plane are progressively increased in size (area) from the bottom toward the mid stage of the multilayered body as illustrated in FIG. 2. In the shaped article 50 manufactured in such a shape that increases in size along the layer-stacked direction when viewed in cross section, the end of one layer 50*a* is sticking out sideways further than the end of another layer 50*a* already formed below the one layer 50*a*. To form the layers 50*a* thus characterized, support material layers may preferably be formed.

In FIG. 4, (d) is a drawing of the step of forming the second layer 50*a* (2). Referring to this drawing, a part 53 (2) of the colored layer in the second layer 50*a* (2) is formed so as to overlap a part 54 (1) of the second transparent layer in the first layer 50*a* (1). Since the second layer 50*a* (2) is greater in size (area) along the X-Y plane than the first layer 50*a* (1), the part 54 (2) of the second transparent layer forming the end of the second layer 50*a* (2) is sticking out sideways further than the part 54 (1) of the second transparent layer forming the end of the first layer 50*a* (1). Because of this structure, the ink to be deposited on a part of the layer 50*a* (2) where the stick-out part should be formed possibly runs off this part and drops downward. To avoid that, a support material 60 is formed on the outer side (on the lateral side) than the part 54 (1) of the second transparent layer in the first layer 50*a* (1).

The support material 60 may preferably be formed from any ink that can be discharged by inkjet printing technique. The support material 60 should preferably have enough strength not to collapse under the weight of another layer formed thereon. The support material 60 per se will not be left in the finalized shaped article 50. The ink forming the support material 60, therefore, should preferably be selected from inks that can be stripped off afterwards. The ink of the support material 60 may preferably be curable by ultraviolet light (to a degree of cure at which the ink is stripped off in subsequent steps), or may be a water-soluble ink that can be dissolved in water and removed in subsequent steps.

The steps of forming the layers 50*a* are repeatedly performed in the X and Y directions as many times as required to form one layer, and then repeatedly performed again in the Z direction. As a result, the shaped article 50 illustrated in FIG. 2 is finally obtained. During the steps of forming one layer, the known interlace scan conventionally employed to form two-dimensional images may preferably be performed to obtain a shaped article with less unevenness in shape and favorably decorated.

The shaped article manufacturing method according to this embodiment is further characterized in that the layer forming process includes steps of: forming the part 54 of the second transparent layer using the transparent ink; forming the part 53 of the colored layer using the coloring inks; forming the part 52 of the first transparent layer using the transparent ink; and forming the part 51 of the light reflective layer using the light reflective ink, wherein the step of forming the part 53 of the colored layer is performed subsequent to the step of forming the part 52 of the first transparent layer and the step of forming the part 54 of the second transparent layer to form the part 53 of the colored layer between the part 52 of the first transparent layer and the part 54 of the second transparent layer. When the part 53 of the colored layer is formed, the part 54 of the second transparent layer may serve as the outer moat of the pooled inks to form the colored layer. This may prevent the ink of the colored layer from spreading unintendedly, ensuring a high accuracy of the part 53 of the colored layer.

Further benefits delivered by forming the part 54 of the second transparent layer are described referring to FIG. 6 and FIG. 7. FIG. 6 is a drawing of a part of the shaped article 50 according to this embodiment, which is the part of (d) of FIG. 4 from which the support material has been removed. FIG. 7 is a cross-sectional view of a shaped article for comparison. The shaped article for comparison is formed by the multilayer lamination technique similarly to the shaped article 50 according to this embodiment. Unlike the shaped article 50, however, this shaped article lacks parts corresponding to the part 52 of the first transparent layer and the part 54 of the second transparent layer. In this shaped article for comparison, therefore, the light reflective layer is directly coated with the colored layer. Provided that the upper layer is larger in size (area) along the X-Y plane than the lower layer in the shaped article for comparison, problems with this shaped article are described.

In the shaped article for comparison illustrated in FIG. 7, the end of the upper layer includes a colored layer 152 (2). The colored layer 152 (2) is sticking out further than a colored layer 152 (1) formed on the end of the lower layer. This shaped article, therefore, involves the risk that the inks for the colored layer discharged to form the stick-out part run off a coloring position and drop downward.

The colored layer is the deciding factor for the color tone of the shaped article. Therefore, thus losing the inks of the colored layer may cause an intended color tone of the shaped article to change.

On the other hand, the shaped article 50 according to this embodiment illustrated in FIG. 6 has the parts 54 of the second transparent layer at the ends of the layers 50a. The ink applied to form the parts 54 of the second transparent layer, even if it falls downward in FIG. 6, may not adversely affect a color tone desirably expressed because the colored layer is the deciding factor for the color tone. This embodiment may thus successfully manufacture the shaped article 50 that excels in reliability and exhibits a desired color tone.

There are other benefits as well. One of them is, forming the part 54 of the second transparent layer in the first layer 50a (1) allow a larger formation area (formation allowable region) to be secured for the colored layer of the second layer 50a (2). This may help to mitigate a demanded degree of manufacturing accuracy to some extent, conducing to an improved manufacturing efficiency.

The ability to secure a larger formation area is advantageously effective even if the part 54 of the second transparent layer is formed subsequent to the part 53 of the colored layer. This disclosure, therefore, further includes forming the part 54 of the second transparent layer subsequent to the part 53 of the colored layer.

In the shaped article 50 according to this embodiment, the surface of the colored layer 3 is coated with the second transparent layer 4. The second transparent layer 4 thus serves as the protective layer of the colored layer 3.

FIG. 4 illustrates an example in which the upper layer is greater in size (area) along the X-Y plane than the lower layer. This example refers to the lower half of the shaped article 50 of FIG. 1 split in two halves.

The manufacturing method described so far is basically applicable to the upper-half structure of the shaped article 50 of FIG. 1 split in two halves. As for the upper half of the shaped article 50, as illustrated in FIG. 2, the upper colored layer is nearer to the center side of the layer 50a than the lower colored layer, and the parts 53 of the upper colored layer overlap the parts 52 of the lower first transparent layer. Further, the parts 54 of the upper second transparent layer overlap the parts 53 of the lower colored layer.

In the upper half of the shaped article 50, as illustrated in FIG. 2, the lower layers are greater in size (area) along the X-Y plane than the upper layers formed thereon. In this upper-half structure, the ink applied to form the colored layer in the upper layers is very unlikely to drop downward. No support material may be necessary at the time of manufacturing the upper-half structure.

In the shaped article of FIG. 2 according to this embodiment, the bottom layer and layers nearby, and the top layer and layers nearby include: a layer solely having the part 52 of the first transparent layer, part 53 of the colored layer, and part 54 of the second transparent layer; a layer solely having the part 53 of the colored layer and the part 54 of the second transparent layer; and a layer solely having the part 54 of the second transparent layer. This multilayered structure may effectuate a shaped article whose entire surface is covered with the second transparent layer 4, colored layer 3, and first transparent layer 2. This disclosure, however, is not limited to such a multilayered structure. For example, the top and bottom surfaces of the shaped article may include none of the second transparent layer, colored layer, or first transparent layer, as in the multilayered structure of FIG. 9 described later.

[8] Modified Example

First Modified Example

The shaped article 50 according to this embodiment includes the first transparent layer 2, colored layer 3, and second transparent layer 4 that are formed along the surface of the light reflective layer 1. However, this disclosure may include but is not limited to such a structure, and may optionally have a shaped article illustrated in FIG. 8.

In the shaped articles illustrated in (a)~(d) of FIG. 8, the second transparent layer 4 may have a shape described below instead of the shape along the surface of the light reflective layer 1. Because the parts 54 of the second transparent layer constitute the ends of the layers 50a (FIG. 2), the second transparent layer 4 may be formed in an adequate shape that contains therein the shaped article (structure described in the earlier embodiment including the colored layer 3, first transparent layer, and light reflective layer), as illustrated in (a)~(d) of FIG. 8.

Containing the shaped article in the shape formed by the second transparent layer 4, as described in this first modified example, may be useful for any shaped articles that are mechanically fragile. For example, this modified example may be effectively applicable when, for example, molding insects' legs and wings, and stems and petals of flowering plants. When molding organisms and plants in the form of decorative ornaments or specimens, they can be scanned alive by a three-dimensional scanner and released again into the nature when the molding is over. A further benefit may be eco-friendliness because no support material is necessary, producing no waste material.

In the shaped article illustrated in (a) of FIG. 8, the second transparent layer 4 has a hexahedral shape that contains a spherical body including the colored layer 3, first transparent layer, and light reflective layer. The structure illustrated in (a) of FIG. 8 may be obtained by a manufacturing method similar to the method of FIG. 4.

In FIG. 8, (b) illustrates a shaped article 50 of frame-mounted type, wherein a figure including the colored layer 3, first transparent layer, and light reflective layer is contained in the second transparent layer 4. This is a free-standing shaped article 50 supported by the second transparent layer 4. This shaped article 50 of frame-mounted type may be manufactured (fabricated) by the manufacturing method described in the earlier embodiment.

In FIG. 8, (c) illustrates a shaped article 50 for use as a strap, wherein a figure including the colored layer 3, first transparent layer, and light reflective layer is contained in the second transparent layer 4, and a hole 70 is formed in a part of the second transparent layer 4. This may be used as a strap or a key holder attachable to, for example, a mobile telephone. The hole 70 of the second transparent layer 4 may be formed at the same time when the outer shape is formed by the second transparent layer 4. By punching a hole in the second transparent layer 4, the figure including the colored layer 3, first transparent layer, and light reflective layer can avoid being damaged with a hole.

In the shaped article 50 illustrated in (d) of FIG. 8, the upper-half of a figure's body including the colored layer 3, first transparent layer, and light reflective layer is contained in the second transparent layer 4. This article 50 has, on the surface or inside of the second transparent layer 4, a three-dimensional image 71 decorated with a mark or a frame or painted in a pale color. This shaped article 50 further has, on the surface or inside of the second transparent layer 4, a letter/character area 72 with letters and/or characters representing date, name, or place. The decorated three-dimensional image 71 and the letter/character area 72 may be formed at the same time when the outer shape is formed by the second transparent layer 4. Instead of the decorated three-dimensional image 71 and the letter/character area 72, other additional information may be displayed on the surface or inside of the second transparent layer 4.

In (b)~(d) of FIG. 8, one figure is contained in the second transparent layer 4, however, the number of figures containable in the second transparent layer 4 may be other than one.

In case the shaped article according to this embodiment has a ring-like shape, the colored layer may be formed near an inner peripheral end of the ring shape as well as an outer peripheral end thereof. In conclusion, the colored layer may be formed on the surface of the shaped article, and the second transparent layer may be further formed thereon.

Instead of forming the second transparent layer 4 in any desired shape as described in this modified example, the second transparent layer 4 may be formed in a shape suitable for the surface of the light reflective layer 1 similarly to the earlier embodiment. In that case, the obtained shaped article may be sealed in an optionally-shaped resin.

Second Modified Example

The shaped article 50 according to this embodiment has the second transparent layer 4 on its outermost side. This disclosure may achieve its goal in so far as the first transparent layer is interposed between the colored layer and the light reflective layer. This disclosure, therefore, may include, as an embodiment, a shaped article 50' illustrated in cross section in FIG. 9. A second modified example is hereinafter described referring to FIG. 9 to FIG. 11. FIG. 9 is a cross-sectional view of the shaped article 50' according to the second modified example, illustrated similarly to FIG. 2. FIG. 10 is a schematic drawing of the lower surface of an inkjet head device according to the second modified example used in manufacturing of the shaped article 50'. FIG. 11 shows drawings of manufacturing steps for the shaped article 50' according to the second modified example.

A difference between the shaped article 50' according to the second modified example and the shaped article 50 according to the earlier embodiment is that the shaped article 50' according to the second modified example has the colored layer 3 as its outermost layer, unlike the shaped article 50 whose outermost layer is the second transparent layer 4.

Referring to FIG. 9, layers 50'a constituting the shaped article 50' according to the second modified example include no part 54 of the second transparent layer, unlike the layers 50a according to the earlier embodiment (FIG. 2) having these parts 54 at their ends.

In the layers 50'a of the shaped article 50' illustrated in FIG. 9, the parts 52 of the first transparent layer are interposed between the parts 53 of the colored layer and the parts 51 of the light reflective layer. This may prevent the coloring inks applied to form the parts 53 of the colored layer from blending into the ink of the parts 51 of the light reflective layer. Even if the coloring inks of the part 53 of the colored layer are mixed with the transparent ink of the part 52 of the first transparent layer, intermixing of these inks may cause no undesirable change to the color tone of the part 53 of the colored layer. Therefore, the resulting shaped article exhibits a desired color tone expressed by the colored layer.

A manufacturing method for the shaped article 50' of FIG. 9 is hereinafter described. The shaped article 50' of FIG. 9 may be manufactured by an inkjet head device 10' illustrated in FIG. 10.

The inkjet head device 10' illustrated in FIG. 10 has, on its lower surface, roughly two inkjet heads 11H' and 12H'. As illustrated in FIG. 10, the first inkjet head 11H' and the second inkjet head 12H' are displaced from each other in both of the X and Y directions.

The first inkjet head 11H' is the same as the first inkjet head 11H illustrated in FIG. 3.

The second inkjet head 12H' includes a white ink nozzle 10 (W) for discharging a white ink (W) used to form the light reflective layer 1 (parts 51 of the light reflective layer), and a transparent ink nozzle 10 (CL) for discharging a transparent ink (CL).

The steps of manufacturing the shaped article 50' using the inkjet head device 10' are hereinafter described referring to FIG. 11.

In step S1' illustrated in (a) of FIG. 11, the part 52 of the first transparent layer is formed from the transparent ink, and the part 51 of the light reflective layer is formed from the white ink (W). In this step, the inkjet head device 10' is moved in a negative direction along the X axis, and the transparent ink is discharged at a predetermined timing through the transparent ink nozzle 10 (CL), and the white ink (W) is discharged at a predetermined timing through the white ink nozzle 10 (W). The discharged inks land on a position at which the part 52 of the first transparent layer should be formed and a position at which the part 51 of the light reflective layer should be formed. Then, the discharged inks pooled at the respective positions are irradiated with ultraviolet light to be cured. As a result, the part 52 of the first transparent layer and the part 51 of the light reflective layer are formed as illustrated in (a) of FIG. 11.

In step S2' illustrated in (b) of FIG. 11, the inkjet head device 10' is moved in a positive direction along the X axis, and the colored layer forming inks including the coloring inks are discharged at a predetermined timing to land on a position at which the part 53 of the colored layer should be formed. Then, the discharged ink pooled at the position is irradiated with ultraviolet light to be cured.

As a result of steps S1 and S2, the formation of a layer 50'a is completed. The support material 60 described in the earlier embodiment is formed in the second modified example as well.

After the layer 50'a illustrated in (b) of FIG. 11 is formed, a new layer 50'a is formed on the layer 50'a of (b) of FIG. 11 in steps similar to steps S1' and S2'.

Specifically, step S3' illustrated in (c) of FIG. 11 forms the part 52 of the first transparent layer and the part 51 of the light reflective layer in a manner similar to step S1'. In step S3', the upper layer 50'a needs to be formed in a greater size (area) along the X-Y plane than the lower layer 50'a, as described in the earlier embodiment. To this end, as illustrated in (c) of FIG. 11, the transparent ink is discharged so that the part 52 of the first transparent layer in the upper layer 50'a overlaps the part 53 of the colored layer in the lower layer 50'a already formed by the time when step S2' is completed. At the same time, the white ink (W) is discharged and pooled so that the part 51 of the light reflective layer in the upper layer 50'a overlaps the part 51 of the light reflective layer and the part 52 of the first transparent layer in the lower layer 50'a. Then, the pooled ink is irradiated with ultraviolet light to be cured.

In step S4' illustrated in (d) of FIG. 11, the colored layer forming inks are discharged at a predetermined timing in a manner similar to step S1' to land on a position at which the part 53 of the colored layer should be formed and pooled at the position. The predetermined timing refers to a timing of discharging the colored layer forming inks on the outer side of the part 52 of the first transparent layer in the upper layer 50'a with no overlap with the part 53 of the colored layer in the lower layer 50'a. The pooled ink is irradiated with ultraviolet light and thereby cured. Then, the part 53 of the colored layer in the upper layer 50'a is formed.

By repeatedly forming and stacking the layers 50'a on one another, the shaped article 50' illustrated in FIG. 9 may be manufactured.

Third Modified Example

In the embodiment described earlier, the shaped article 50 is manufactured by the inkjet head device 10 illustrated in FIG. 3. In the second modified example, the shaped article 50' is manufactured by the inkjet head device 10' illustrated in FIG. 10. Instead of these inkjet head devices, inkjet head devices illustrated in FIG. 12 to FIG. 14 may be used.

FIG. 12 is a drawing of a modified example of the inkjet head device, illustrated similarly to FIG. 3 and FIG. 10. In an inkjet head device 10a illustrated in FIG. 12, a cyan ink nozzle 10 (C), a magenta ink nozzle 10 (M), a yellow ink nozzle 10 (Y), a black ink nozzle 10 (K), a white ink nozzle 10 (W), and a transparent ink nozzle 10 (CL) are arranged in the mentioned order in the X direction.

FIG. 13 is a drawing of another modified example of the inkjet head device, illustrated similarly to FIG. 3 and FIG. 10. In an inkjet head device 10b illustrated in FIG. 13, a white ink nozzle 10 (W), a transparent ink nozzle 10 (CL), a yellow ink nozzle 10 (Y), a magenta ink nozzle 10 (M), a cyan ink nozzle 10 (C), a black ink nozzle 10 (K), a transparent ink nozzle 10 (CL), and a white ink nozzle 10 (W) are arranged in the mentioned order in the X direction.

FIG. 14 is a drawing of yet another modified example of the inkjet head device. An inkjet head device 10b illustrated in FIG. 14 has a carriage 21 allowed to reciprocate along the X axis, a plurality of nozzle arrays mounted in the carriage 21, and ultraviolet irradiators 24a and 24b mounted in the carriage 21. The carriage 21 is moved in the Y direction to perform a scan, in which the inks of ultraviolet curing type are discharged from the nozzle arrays and irradiated with ultraviolet light emitted from the ultraviolet irradiators 24a and 24b.

The nozzle arrays are aligned along the X direction as illustrated in FIG. 14. From the left to right in the X direction on the drawing are arranged a cyan ink nozzle array C, a magenta ink nozzle array M, a yellow ink nozzle array Y, a black ink nozzle array K, a white ink nozzle array W, and a transparent ink nozzle array CL are aligned in the mentioned order. Since the nozzle arrays are mounted in the carriage 21, the inks of ultraviolet curing type are dischargeable from these nozzle arrays while moving in the X direction with the carriage 21.

Because all of the nozzles are aligned in the X direction in FIG. 12, FIG. 13, and FIG. 14, the formation of one layer may be completed by moving the nozzles once in the X direction and discharging all of the required ink during the movement. Referring to FIG. 14, all of the inks may be discharged and irradiated with ultraviolet light by moving the nozzles just once in the X direction. This may also be applicable to a layer formed from the inks of ultraviolet curing type, which may be cured as soon as the inks are discharged.

[Additional Remarks]

The shaped article 50 according to one aspect is a shaped article 50 formed by the multilayer lamination technique and having the colored layer 3. This shaped article is further characterized in that the colored layer 3 has its ink density filled by the supplementary ink in parts of the colored layer 3 in which the coloring inks alone are insufficient to meet a predetermined ink density.

By forming the colored layer using the coloring inks alone, the ink density of the colored layer may be partly insufficient, failing to meet a predetermined ink density. This may generate irregularities and/or voids in the decorative layer. The irregularities and/or voids may incur failure to obtain any desired shape of the shaped article in the manufacturing process. On the other hand, the shaped article 50 according to one aspect may eliminate the risk of such irregularities and/or voids because the ink density of the colored layer 3 is filled by the supplementary ink. This may allow the shaped article 50 to exhibit a desired color tone (decorated as desired) and allow the shaped article 50 to be shaped as desired.

The shaped article 50 according to one aspect is further characterized in that the supplementary ink includes a transparent ink. Using the transparent ink may be unlikely to adversely affect decorative effects expected for the colored layer, successfully providing a shaped article exhibiting a desired color tone.

A manufacturing method for the shaped article 50 according to one aspect is a manufacturing method that employs the multilayer lamination technique to form the shaped article having the colored layer 3, further characterized in that the colored layer 3 has its ink density filled by the supplementary ink in parts of the colored layer 3 in which coloring inks alone are insufficient to meet a predetermined ink density.

By forming the colored layer using the coloring inks alone, the ink density of the colored layer may be partly insufficient, failing to meet a predetermined ink density. This may generate irregularities and/or voids in the decorative layer. The irregularities and/or voids may incur failure to obtain any desired shape of the shaped article in the manufacturing process. The method according to one aspect, on the other hand, may eliminate the risk of such irregularities and/or voids because the ink density of the colored layer 3 is filled by the supplementary ink. This may allow the shaped article 50 to exhibit a desired color tone (decorated as desired) and allow the shaped article 50 to be shaped as desired.

The manufacturing method for the shaped article 50 according to one aspect is further characterized in including a layer forming process including forming layers 50a each including a part 53 of the colored layer, in which one of the layers 50a is newly formed on another one of the layers 50a so that the parts 53 of the colored layer in these layers are continuous and thereby form the colored layer 3, and the layer forming process further includes filling the ink density of the colored layer using the supplementary ink in the parts 53 of the colored layer in which the coloring inks alone are insufficient to meet a predetermined ink density.

This method fills the ink density of the colored layer in the parts 53 of the colored layer formed by the layer forming process. This method thus advantageous may successfully form layers with neither irregularity nor void.

This disclosure is not necessarily limited to the embodiment described so far and may be carried out in many other forms. The technical scope of this disclosure encompasses any modifications within its scope defined by the appended claims and embodiments obtained by variously combining the technical means disclosed herein. By variously combining the technical means disclosed in the embodiment and modified examples, additional technical features may be further presented.

Third Embodiment

The inventors of this application found a problem with the known inkjet 3D molding when a molding ink and decorative inks (coloring inks of, for example, yellow, magenta, cyan, and black inks) were discharged by inkjet printing technique. The problem is that a shaped article may fail to be decorated as desired (recording of characters and images in colors through subtractive color mixture). They studied what triggered this problem, and found out that, when forming a decorative layer formed from decorative inks as the outermost layer of a shaped article, the decorative inks for the decorative layer discharged in the gravitational direction (downward) would possibly fail to arrive at a target position, dropping downward.

To address the issue, this disclosure is directed to providing a shaped article that may be decorated as desired, and a manufacturing method for such a shaped article.

A shaped article disclosed herein includes: a light reflective layer formed from an ink having light reflectiveness; a decorative layer; and a transparent layer formed from a transparent ink, wherein the decorative layer is formed on an outer side of the light reflective layer, and the transparent layer is formed on an outer side of the decorative layer.

In this shaped article, a larger formation area including an area overlapping a part of the transparent layer in addition to an area overlapping a part of the decorative layer in the lower layer may be secured for a part of the decorative layer in the upper layer, as compared to layers lacking the parts of the transparent layer at positions nearer to the end side than the parts of the decorative layer. This may help to mitigate a demanded degree of manufacturing accuracy to some extent, contributing to an improved manufacturing efficiency.

To this end, a shaped article manufacturing method disclosed herein is a manufacturing method for manufacturing a shaped article by stacking a plurality of layers on one another, the shaped article including: a transparent layer formed from a transparent ink; and a decorative layer, wherein the transparent layer and the decorative layer are formed in this order from an outer-layer side toward an inner side of the shaped article. This method includes a layer forming process including forming a part of the transparent layer and a part of the decorative layer in this order from an end side toward a center side of at least two of the layers.

Two or more of the formed layers have the parts of the transparent layer at positions nearer to the end side than the parts of the decorative layer. When two or more layers are formed, even if a layer forming ink applied on the end side of the upper layer drops downward, the layer formed on the end side is the transparent layer, not the decorative layer. This may avoid loss of the decorative layer inks, successfully forming a shaped article decorated as desired.

According to this method, a larger formation area including an area overlapping a part of the transparent layer in addition to an area overlapping a part of the decorative layer in the lower layer may be secured for a part of the decorative layer in the upper layer, as compared to layers lacking the parts of the transparent layer at positions nearer to the end side than the parts of the decorative layer. This may help to mitigate a demanded degree of manufacturing accuracy to some extent, contributing to an improved manufacturing efficiency.

The shaped article manufacturing method disclosed herein according to one aspect is further characterized in that the layer forming process includes steps of forming a part of the transparent layer; and forming a part of the decorative layer, wherein the step of forming a part of the transparent layer precedes the step of forming a part of the decorative layer.

According to this method that forms, in a layer, a part of the transparent layer before a part of the decorative layer, the part of the transparent layer may serve as the outer moat of the part of the decorative layer to be later formed. This may prevent the ink applied to form the part of the decorative layer from spreading unintendedly or dropping downward.

The shaped article manufacturing method disclosed herein according to one aspect is further characterized in that one of the layers is newly formed on another one of the layers formed by the layer forming process, so that a part of the decorative layer in the layer newly formed overlaps a part of the transparent layer in the layer below previously formed.

The shaped article manufacturing method disclosed herein according to one aspect is further characterized in that one of the layers is newly formed on another one of the layers formed by the layer forming process, so that a part of the transparent layer in the layer newly formed overlaps a part of the decorative layer in the layer below previously formed.

This disclosure may provide a shaped article exhibiting a desired color tone.

An embodiment of a shaped article and a shaped article manufacturing method disclosed herein is hereinafter described referring to FIG. 1 to FIG. 8. The shaped article disclosed herein has a three-dimensional structure constructed of a laminate of layers (formed by multilayer lamination technique). In the embodiment hereinafter described, inkjet printing technique is employed to manufacture the shaped article. This is, however, just an option presented in this disclosure. This disclosure may be applicable to any kinds of manufacturing methods that can obtain a shaped article by leveraging the multilayer lamination technique and decorate its surface (recording of characters and images in colors).

[1] Structure of Shaped Article

FIG. 1 is a perspective view of an outer shape of a shaped article 50 according to an embodiment. The shaped article 50 according to this embodiment has a substantially cylindrical shape with a curved side surface bulging outward. The shaped article disclosed herein and the shaped article manufactured by the manufacturing method disclosed herein may not be limited to the shape illustrated in FIG. 1. There are many other examples of the shape, including a hexahedral shape described later, a spherical shape, a hollow structure, a ring-like shape, and a horseshoe-like shape.

The shaped article 50 according to this embodiment includes a second transparent layer, a colored layer (decorative layer) formed from colorant-containing inks (decorative ink), a first transparent layer formed from a transparent ink, and a light reflective layer formed from an ink having light reflectiveness, wherein these layers are formed in the mentioned order from an outer-layer side (outer peripheral side) toward an inner side (center) of the shaped article 50. This is a distinctive technical feature of this disclosure. FIG. 1 is a drawing of the shaped article 50. In this drawing, a second transparent layer 4 formed from a transparent ink, which is the outermost layer, can be seen on the curved side surface of the shaped article 50.

FIG. 2 is a cross-sectional view of the illustration of FIG. 1 taken along a cutting-plane line A-A'. The cross-sectional view of the shaped article 50 illustrated in FIG. 2 is taken at a central position of the shaped article 50 along the X-Z plane of the XYZ coordinate system illustrated in FIG. 1.

The embodiment of FIG. 2 presents an example of the shaped article 50 having a three-dimensional structure formed by stacking 21 layers 50a on one another in the Z direction. It should be understood that the shaped article 50 may include less than or more than 21 layers.

[2] Structures of Layers

FIG. 5 is a drawing of the X-Y plane of a layer 50a in the vicinity of a mid-stage of the shaped article 50. The layers 50a each include a part 54 of the second transparent layer, a part 53 of the colored layer, a part 52 of the first transparent layer, and a part 51 of the light reflective layer. These layers are formed in the mentioned order from an outer peripheral side toward a center side of the shaped article. If the shaped article 50 according to this embodiment is stated another way, the light reflective layer 1, which is the body of the shaped article, is coated with the first transparent layer 2, colored layer 3, and second transparent layer 4 in the mentioned order toward the outer-layer side (outer peripheral side). Each one of the layers 50a has a thickness in the Z direction (vertical direction in the drawing) between 5 μm and 50 μm. This is an adequate range of thickness values for multicolor formation of the colored layer 3 using the subtractive color mixture. For example, a preferable range of thickness values is 10 μm to 25 μm when layers are formed from inks of ultraviolet curing type by inkjet printing technique.

In this embodiment, the light reflective layer 1 is the body of the shaped article; however, the light reflective layer may or may not constitute the body of the shaped article. Specifically, the shaped article may have, at its center, a body or a cavity apart from the light reflective layer, wherein the light reflective layer, first transparent layer, colored layer, and second transparent layer are formed in the mentioned order from the body (may or may not have light reflectiveness) toward the outer-layer side (outer peripheral side). Alternatively, a core (may or may not have light reflectiveness) and the light reflective layer 1 formed on a surface of the core may be collectively regarded as the body of the shaped article.

By stacking the layers 50a in the Z direction as illustrated in FIG. 2, the parts 54 of the second transparent layer in the respective layers 50a are substantially continuous in a direction along the outermost surface of the shaped article 50, forming the second transparent layer 4. The parts 53 of the colored layer in the respective layers 50a are substantially continuous in the direction along the outermost surface of the shaped article 50, forming the colored layer 3. The parts 52 of the first transparent layer in the respective layers 50a are substantially continuous in the direction along the outermost surface of the shaped article 50, forming the first transparent layer 2. The parts 51 of the light reflective layer in the respective layers 50a are substantially continuous in the direction along the outermost surface of the shaped article 50, forming the light reflective layer 1.

Looking at, in any of the X, Y, and Z directions, the outer surface of the shaped article 50 including the second transparent layer, colored layer, first transparent layer, and light reflective layer arranged in the mentioned order, a color tone produced by the subtractive color mixture may be visually recognized.

The parts 52 of the first transparent layer may preferably have a dimension in the direction of X-Y plane slightly greater than the part 53 of the colored layer vertically in contact with the parts 52. This may more reliably prevent intermixing of the inks forming the colored layer 3 and the light reflective layer 1.

The parts 54 of the second transparent layer may preferably have a dimension in the direction of X-Y plane slightly greater than the parts 53 of the colored layer vertically in contact with the parts 54. This may provide for better protection of the colored layer 3.

The width of the shaped article 50 along the Z direction (hereinafter may be referred to as thickness or height in the Z direction) is not particularly limited. The thickness (height) of the layer 50a in the Z direction may be optionally decided depending on the number of layers. As described later, this embodiment constructs the multilayered structure using the inkjet printing technique. Therefore, any feasible values in the technique should be contemplated for the thickness of the layer 50a in the Z direction. When inks of ultraviolet curing type are applied by inkjet printing technique to form the layers (described later), the layer 50a may have a thickness ranging from 5 μm to 20 μm depending on the sizes of ink droplets. As for a large-sized shaped article for which a high resolution is not particularly required, plural layers may be formed based on the same data simply by increasing the sizes of ink droplets. In such a case, a smaller data volume and a higher molding rate may be anticipated.

[3] Structure of Light Reflective Layer 1 (Parts 51 of Light Reflective Layer)

The light reflective layer 1 (parts 51 of the light reflective layer) is a layer formed from a light reflective ink. This layer, therefore, has light reflectiveness that allows rays of light in the whole visible light region to be reflected on at least the surface of the light reflective layer 1 in contact with the colored layer.

Specific examples of ink of the light reflective layer 1 (parts 51 of the light reflective layer) may include metallic powder-containing inks and white pigment-containing inks. The light reflective layer 1 may preferably be formed from a white ink. The light reflective layer 1 formed from a white ink may adequately reflect rays of light entering from the outer-layer side of the shaped article, allowing the shaped article to be colored by the subtractive color mixture.

In this embodiment, the light reflective layer 1 constitutes the body of the shaped article. In case the light reflective layer 1 is formed on the surface of the body of any shaped article for which light reflectiveness is not required, the thickness of the light reflective layer 1, i.e., the width of the part 51 of the light reflective layer from the outer peripheral side to the center side, as illustrated in FIG. 2, may be between 5 pill and 20 µm at the least. The width in this disclosure may include but is not limited to the range of values.

[4] Structure of First Transparent Layer 2 (Parts 52 of First Transparent Layer)

The first transparent layer 2 (parts 52 of the first transparent layer) is formed from a transparent ink.

The transparent ink may refer to an ink capable of forming a transparent layer having light transmittance greater than or equal to 50% per unit thickness. The light transmittance less than 50% per unit thickness of the transparent layer may unintendedly block the transmission of light. This may be a drawback that fails to exhibit a desired color tone of the shaped article by way of the subtractive color mixture. Preferably is used an ink having light transmittance greater than or equal to 80% per unit thickness of the transparent layer. Further, an ink having light transmittance greater than or equal to 90% per unit thickness of the transparent layer is particularly preferable.

By interposing the first transparent layer 2 (part 52 of the first transparent layer) between the light reflective layer 1 (part 51 of the light reflective layer) and the colored layer 3 (part 53 of the colored layer), intermixing of the coloring inks of the colored layer 3 and the ink of the light reflective layer 1 may be avoidable. Even if the coloring inks applied to form the colored layer are mixed with the transparent ink of the first transparent layer, intermixing of these inks may not adversely affect colors of the colored layer or cause any undesirable change to the color tone. Therefore, the resulting shaped article exhibits a desired color tone (decorated as desired) expressed by the colored layer 3.

The width of the part 52 of the first transparent layer from the outer peripheral side to the center side (hereinafter, referred to as the thickness of the first transparent layer) is between 5 µm and 20 µm at the least in a decorated portion on a surface perpendicular to the layer-stacked direction. The width in this disclosure may include but is not limited to the range of values.

[5] Structure of Colored Layer 3 (Part 53 of Colored Layer)

The colored layer 3 (part 53 of the colored layer) is formed from a colorant-containing coloring ink.

Examples of the colorant-containing inks (hereinafter may be referred to as coloring ink) may include but are not limited to yellow (Y), magenta (M), cyan (C), black (K), and pale color inks. Further, red (R), green (G), blue (B), and orange (Or) color inks may be additionally used. Other usable inks may include metallic, pearl, and phosphor inks. One or more than one of these coloring inks may preferably be used to express a desired color tone.

The amounts of the coloring inks to form the colored layer 3 (parts 53 of the colored layer) may be variable depending on a desired (desirably expressed) color tone. In case the coloring inks alone are used to express a bright color tone at a relatively low concentration, the ink density of the colored layer 3 may fail to meet a predetermined ink density. This may generate irregularities in the Z direction and/or ink-less dented parts at positions along the X-Y direction. In any case, the shaped article formed by the multilayer lamination technique, as described in this embodiment, may consequently have an irregular, unattractive shape, which is desirably avoided. In case one cross-sectional surface of the colored layer 3 has the ink density of two lateral and two vertical ink droplets; four ink droplets in total, formed by the error diffusion method on a vertical mold surface near the mid position of the multilayered structure illustrated in FIG. 2, the coloring inks each form four ink droplets at the most (largest concentration) and no ink droplet at the least (zero concentration, meaning colorless). The number of ink droplets being zero may leave an unfilled space as large as four ink droplets, significantly degrading the shaped article in view of its shape and color tone.

This embodiment, therefore, fills the ink density of the colored layer 3 (part 53 of the colored layer) using a supplementary ink in parts of the colored layer 3 (part 53 of the colored layer) in which the coloring inks alone are insufficient to meet a predetermined ink density. Specifically, the colored layer 3 (parts 53 of the colored layer) is formed at a constant total density (number of ink droplets) of the coloring inks and the supplementary ink. This may successfully prevent the formation of dented parts, allowing the shaped article 50 to be elaborately shaped.

The amounts of the coloring inks to be discharged and their landing positions are known beforehand, based on which the amount and position (landing position) of the supplementary ink to be additionally discharged may be suitably determined. The amount and position may be decided by an inkjet head device 10 or by a controller not illustrated in the drawings.

Having the ink density filled by the supplementary ink may allow a surface formed by the colored layer 3 to be flattened, imparting glossiness to the surface.

The supplementary ink may be any ink unless it adversely affects the color tone to be expressed by the colored layer 3 (parts 53 of the colored layer). An example of the supplementary ink may be the transparent ink used to form the first transparent layer 2 (parts 52 of the first transparent layer) and the second transparent layer 4 (parts 54 of the second transparent layer).

The thickness of the colored layer 3, i.e., the width of the part 53 of the colored layer from the outer peripheral side to the center side illustrated in FIG. 2 (hereinafter, referred to as the thickness of the colored layer 3) may be between 5 µm and 20 µm.

The colored layer 3 described in this embodiment is just an option and may be any decorative layer.

[6] Structure of Second Transparent Layer 4 (Parts 54 of Second Transparent Layer)

The second transparent layer 4 (parts 54 of the second transparent layer) is formed from the same transparent ink as that of the first transparent layer 2 (parts 52 of the first transparent layer). The same transparent ink or different transparent inks may be used to form the second transparent layer 4 and the first transparent layer 2.

The thickness of the second transparent layer 4, i.e., the width of the part 54 of the second transparent layer from the outer peripheral side to the center side illustrated in FIG. 2 (hereinafter, referred to as the thickness of the second transparent layer 4) may be between 10 µm and 100 µm.

The second transparent layer 4 functions as a protective layer for the colored layer 3. In this disclosure that employs the multilayer lamination technique (this embodiment), the second transparent layer 4 may also advantageously contribute to elaborateness of the shaped article.

Supposing that the colored layer 3 is the outermost layer of the shaped article 50, i.e., the parts 53 of the colored layer are located at the farthest ends of the respective layers 50a illustrated in FIG. 2, the colored layer 3 (parts 53 of the colored layer) formed may not be as accurate as expected. On the other hand, the shaped article 50 whose outermost layer is the second transparent layer 4 (parts 54 of the second transparent layer), as described in this embodiment, may ensure the accuracy of the colored layer 3 (parts 53 of the colored layer). Thus, the second transparent layer 4 (parts 54 of the second transparent layer) may greatly contribute to a desired color tone.

Another disadvantage in case the colored layer 3 is the outermost layer of the shaped article 50 is that the exposed colored layer 3 may be prone to decolorization under friction and color fading by exposure to ultraviolet. However, as described in this embodiment, the shaped article 50 whose outermost layer is the second transparent layer 4 (parts 54 of the second transparent layer) may prevent such unfavorable events as decolorization and color fading.

[7] Manufacturing Method for Shaped Article

A manufacturing method for the shaped article 50 according to this embodiment is hereinafter described. FIG. 3 is a drawing of the lower surface of the inkjet head device 10 used in the manufacturing method. FIG. 4 shows schematic drawings of ongoing steps of manufacturing the shaped article 50 according to this embodiment.

The inkjet head device 10 has, on its lower surface, roughly three inkjet heads 11H to 13H. As illustrated in FIG. 3, the first inkjet head 11H, second inkjet head 12H, and third inkjet head 13H are displaced from one another in the X direction. As illustrated in FIG. 3, the first inkjet head 11H, second inkjet head 12H, and third inkjet head 13H are also displaced from one another in the Y direction. Thus, the inkjet heads 11H to 13H are positioned in, generally called, staggered arrangement.

The first inkjet head 11H has a cyan ink nozzle 10 (C) for discharging a cyan ink, a magenta ink nozzle 10 (M) for discharging a magenta ink, a yellow ink nozzle 10 (Y) for discharging a yellow ink, and a black ink nozzle 10 (K) for discharging a black ink. The number and the order of arrangement of the nozzles 10 (C), 10 (M), 10 (Y), and 10 (K) are not limited to the example illustrated in FIG. 3. All of the inks discharged through these nozzles are coloring inks used to form the colored layer 3 (parts 53 of the colored layer) illustrated in FIG. 2.

The second inkjet head 12H has a white ink nozzle 10 (W) for discharging a white ink (W). The white ink (W) is an ink used to form the light reflective layer 1 (parts 51 of the light reflective layer) illustrated in FIG. 2.

The third inkjet head 13H has a transparent ink nozzle 10 (CL) for discharging a transparent ink (CL). The transparent ink (CL) is an ink used to form the first transparent layer 2 (parts 52 of the first transparent layer) and the second transparent layer 4 (parts 54 of the second transparent layer) illustrated in FIG. 2.

The inkjet head device 10 is located so as to have its lower surface illustrated in FIG. 3 face the layer 50a currently being formed. The inkjet head device 10 is configured to reciprocate in the X direction and discharge the inks while moving in the direction. The inkjet head device 10 is moved in a predetermined direction in an XYZ coordinate system, or a table with the formed layers 50a placed thereon (FIG. 4 shows a layer formation surface B of the table) is moved in a predetermined direction in the XYZ coordinate system to change relative positions of the inkjet head device 10 and the layer 50a currently being formed. Which one of them should be moved may be optionally decided.

Each of the inks is an ink of ultraviolet curing type that needs to be irradiated with ultraviolet light after being discharged. A ultraviolet irradiator may be mounted in the inkjet head device 10 or may be installed as a separate device. The inks are cured by being irradiated with ultraviolet light to form the layers 50a illustrated in FIG. 2.

The manufacturing process for the shaped article 50 using the inkjet head device 10 is hereinafter described referring to FIG. 4.

To start with, a first one of the layers 50a (first layer 50a (1)) is formed on the layer formation surface B of the table.

In the step of forming (manufacturing) the first layer 50a (1), by using the inkjet printing technique, the respective inks are discharged from the inkjet head device 10 at predetermined timings to form a part of the second transparent layer, a part of the colored layer, a part of the first transparent layer, and a part of the light reflective layer in the mentioned order from the end side toward the center side of the first layer 50a.

The steps of forming (manufacturing) the first layer 50a (1) are described in further detail referring to (a)~(c) of FIG. 4.

In step S1 illustrated in (a) of FIG. 4, the part 54 of the second transparent layer is formed from the transparent ink, and the part 52 of the first transparent layer is formed from the transparent ink. In this step, the inkjet head device 10 is moved in a positive direction along the X axis, and the transparent ink is discharged at a predetermined timing through the transparent ink nozzle 10 (CL) illustrated in FIG. 3. The discharged ink lands on a position at which the part 54 of the second transparent layer should be formed and a position at which the part 52 of the first transparent layer should be formed. Then, the discharged ink pooled at the respective positions is irradiated with ultraviolet light to be cured. As a result, the part 52 of the first transparent layer and the part 54 of the second transparent layer are formed as illustrated in (a) of FIG. 4.

In step S2 illustrated in (b) of FIG. 4, the inkjet head device 10 is moved in a negative direction along the X axis, and the white ink (W), which is the light reflective ink, is discharged at a predetermined timing through the white ink nozzle 10 (W). Then, the discharged ink pooled there is irradiated with ultraviolet light to be cured. As a result, the part 51 of the light reflective layer is formed as illustrated in (b) of FIG. 4.

In step S3 illustrated in (c) of FIG. 4, the inkjet head device 10 is moved in the positive direction along the X axis, and the colored layer forming inks including the coloring inks and the supplementary ink are discharged at a predetermined timing so that the total amount of these inks discharged is constant, and then irradiated with ultraviolet light. The predetermined timing refers to a timing at which the nozzles of the first inkjet head 11H are located at positions at which the colored layer forming inks are dischargeable in a region between the part 52 of the first transparent layer and the part 54 of the second transparent layer formed in step S1. The ink droplets in a predetermined amount are discharged by inkjet printing technique at this timing to form a pool of ink. Then, the pooled ink is irradiated with ultraviolet light to be cured. This forms the part 53 of the colored layer 53 exhibiting a desired color tone between the part 52 of the first transparent layer and the part 54 of the second transparent layer as illustrated in (c) of FIG. 4.

As a result of steps S1 to S3, the formation of the first layer 50*a* (1) is completed. The first layer 50*a* (1) has the same structure as illustrated in the upper view of the layer 50*a* in FIG. 5. Optionally, step 1 and step 2 may be performed in the reversed order. Likewise, step S2 and step S3 may be performed in the reversed order.

After the first layer 50*a* (1) is formed, a new layer 50*a* (second layer 50*a* (2)) is formed on the first layer 50*a* (1) (laminate of layers).

In the shaped article 50 according to this embodiment, the layers 50*a* stacked on one another are progressively increased in size (area) from the bottom toward the mid stage of the multilayered body as illustrated in FIG. 2. In the shaped article 50 manufactured in such a shape that increases in size along the layer-stacked direction when viewed in cross section, the end of one layer 50*a* is sticking out sideways further than the end of another layer 50*a* already formed below the one layer 50*a*. To form the layers 50*a* thus characterized, support material layers may preferably be formed.

In FIG. 4, (d) is a drawing of the step of forming the second layer 50*a* (2). Referring to this drawing, a part 53 (2) of the colored layer in the second layer 50*a* (2) is formed so as to overlap a part 54 (1) of the second transparent layer in the first layer 50*a* (1). Since the second layer 50*a* (2) is greater in size (area) along the X-Y plane than the first layer 50*a* (1), the part 54 (2) of the second transparent layer forming the end of the second layer 50*a* (2) is sticking out sideways further than the part 54 (1) of the second transparent layer forming the end of the first layer 50*a* (1). Because of this structure, the ink to be deposited on a part of the layer 50*a* (2) where the stick-out part should be formed possibly runs off this part and drops downward. To avoid that, a support material 60 is formed on the outer side (on the lateral side) than the part 54 (1) of the second transparent layer in the first layer 50*a* (1).

The support material 60 may preferably be formed from any ink that can be discharged by inkjet printing technique. The support material 60 should preferably have enough strength not to collapse under the weight of another layer formed thereon. The support material 60 per se will not be left in the finalized shaped article 50. The ink forming the support material 60, therefore, should preferably be selected from inks that can be stripped off afterwards. The ink of the support material 60 may preferably be curable by ultraviolet light (to a degree of cure at which the ink is stripped off in subsequent steps), or may be a water-soluble ink that can be dissolved in water and removed in subsequent steps.

The steps of forming the layers 50*a* are repeatedly performed in the X and Y directions as many times as required to form one layer, and then repeatedly performed again in the Z direction. As a result, the shaped article 50 illustrated in FIG. 2 is finally obtained. During the steps of forming one layer, the known interlace scan conventionally employed to form two-dimensional images may preferably be performed to obtain a shaped article with less unevenness in shape and favorably decorated.

The shaped article manufacturing method according to this embodiment is further characterized in that the layer forming process includes steps of: forming the part 54 of the second transparent layer using the transparent ink; forming the part 53 of the colored layer using the coloring inks; forming the part 52 of the first transparent layer using the transparent ink; and forming the part 51 of the light reflective layer using the light reflective ink, wherein the step of forming the part 53 of the colored layer is performed subsequent to the step of forming the part 52 of the first transparent layer and the step of forming the part 54 of the second transparent layer to form the part 53 of the colored layer between the part 52 of the first transparent layer and the part 54 of the second transparent layer. When the part 53 of the colored layer is framed, the part 54 of the second transparent layer may serve as the outer moat of the pooled inks to form the colored layer. This may prevent the ink of the colored layer from spreading unintendedly, ensuring a high accuracy of the part 53 of the colored layer.

Further benefits delivered by forming the part 54 of the second transparent layer are described referring to FIG. 6 and FIG. 7. FIG. 6 is a drawing of a part of the shaped article 50 according to this embodiment, which is the part of (d) of FIG. 4 from which the support material has been removed. FIG. 7 is a cross-sectional view of a shaped article for comparison. The shaped article for comparison is formed by the multilayer lamination technique similarly to the shaped article 50 according to this embodiment. Unlike the shaped article 50, however, this shaped article lacks parts corresponding to the part 52 of the first transparent layer and the part 54 of the second transparent layer. In this shaped article for comparison, therefore, the light reflective layer is directly coated with the colored layer. Provided that the upper layer is larger in size (area) along the X-Y plane than the lower layer in the shaped article for comparison, problems with this shaped article are described.

In the shaped article for comparison illustrated in FIG. 7, the end of the upper layer includes a colored layer 152 (2). The colored layer 152 (2) is sticking out further than a colored layer 152 (1) formed on the end of the lower layer. This shaped article, therefore, involves the risk that the inks for the colored layer discharged to form the stick-out part run off a coloring position and drop downward.

The colored layer is the deciding factor for the color tone of the shaped article. Therefore, thus losing the inks of the colored layer may cause an intended color tone of the shaped article to change.

On the other hand, the shaped article 50 according to this embodiment illustrated in FIG. 6 has the parts 54 of the second transparent layer at the ends of the layers 50*a*. The ink applied to form the parts 54 of the second transparent layer, even if it falls downward in FIG. 6, may not adversely affect a color tone desirably expressed because the colored layer is the deciding factor for the color tone. This embodiment may thus successfully manufacture the shaped article 50 that excels in reliability and exhibits a desired color tone.

There are other benefits as well. One of them is, forming the part 54 of the second transparent layer in the first layer 50*a* (1) allow a larger formation area to be secured for the colored layer of the second layer 50*a* (2). This may help to mitigate a demanded degree of manufacturing accuracy to some extent, conducing to an improved manufacturing efficiency.

The ability to secure a larger formation area is advantageously effective even if the part 54 of the second transparent layer is formed subsequent to the part 53 of the colored layer. This disclosure, therefore, further includes forming the part 54 of the second transparent layer subsequent to the part 53 of the colored layer.

In the shaped article 50 according to this embodiment, the surface of the colored layer 3 is coated with the second transparent layer 4. The second transparent layer 4 thus serves as the protective layer of the colored layer 3.

FIG. 4 illustrates an example in which the upper layer is greater in size (area) along the X-Y plane than the lower layer. This example refers to the lower half of the shaped article 50 of FIG. 1 split in two halves.

The manufacturing method described so far is basically applicable to the upper-half structure of the shaped article 50 of FIG. 1 split in two halves. As for the upper half of the shaped article 50, as illustrated in FIG. 2, the upper colored layer is nearer to the center side of the layer 50a than the lower colored layer, and the parts 53 of the upper colored layer overlap the parts 52 of the lower first transparent layer. Further, the parts 54 of the upper second transparent layer overlap the parts 53 of the lower colored layer.

In the upper half of the shaped article 50, as illustrated in FIG. 2, the lower layers are greater in size (area) along the X-Y plane than the upper layers formed thereon. In this upper-half structure, the ink applied to form the colored layer in the upper layers is very unlikely to drop downward. No support material may be necessary at the time of manufacturing the upper-half structure.

In the shaped article of FIG. 2 according to this embodiment, the bottom layer and layers nearby, and the top layer and layers nearby include: a layer solely having the part 52 of the first transparent layer, part 53 of the colored layer, and part 54 of the second transparent layer; a layer solely having the part 53 of the colored layer and the part 54 of the second transparent layer; and a layer solely having the part 54 of the second transparent layer. This multilayered structure may effectuate a shaped article whose entire surface is covered with the second transparent layer 4, colored layer 3, and first transparent layer 2. This disclosure, however, is not limited to such a structure. For example, the top and bottom surfaces of the shaped article may include none of the second transparent layer, colored layer, or first transparent layer.

[8] Modified Example

First Modified Example

The shaped article 50 according to this embodiment includes the first transparent layer 2, colored layer 3, and second transparent layer 4 that are formed along the surface of the light reflective layer 1. However, this disclosure may include but is not limited to such a structure, and may optionally have a shaped article illustrated in FIG. 8.

In the shaped articles illustrated in (a)~(d) of FIG. 8, the second transparent layer 4 may have a shape described below instead of the shape along the surface of the light reflective layer 1. Because the parts 54 of the second transparent layer constitute the ends of the layers 50a (FIG. 2), the second transparent layer 4 may be formed in an adequate shape that contains therein the shaped article (structure described in the earlier embodiment including the colored layer 3, first transparent layer, and light reflective layer), as illustrated in (a)~(d) of FIG. 8.

Containing the shaped article in the shape formed by the second transparent layer 4, as described in this first modified example, may be useful for any shaped articles that are mechanically fragile. For example, this modified example may be effectively applicable when, for example, molding insects' legs and wings, and stems and petals of flowering plants. When molding organisms and plants in the form of decorative ornaments or specimens, they can be scanned alive by a three-dimensional scanner and released again into the nature when the molding is over. A further benefit may be eco-friendliness because no support material is necessary, producing no waste material.

In the shaped article illustrated in (a) of FIG. 8, the second transparent layer 4 has a hexahedral shape that contains a spherical body including the colored layer 3, first transparent layer, and light reflective layer. The structure illustrated in (a) of FIG. 8 may be obtained by a manufacturing method similar to the method of FIG. 4.

In FIG. 8, (b) illustrates a shaped article 50 of frame-mounted type, wherein a figure including the colored layer 3, first transparent layer, and light reflective layer is contained in the second transparent layer 4. This is a free-standing shaped article 50 supported by the second transparent layer 4. This shaped article 50 of frame-mounted type may be manufactured (fabricated) by the manufacturing method described in the earlier embodiment.

In FIG. 8, (c) illustrates a shaped article 50 for use as a strap, wherein a figure including the colored layer 3, first transparent layer, and light reflective layer is contained in the second transparent layer 4, and a hole 70 is formed in a part of the second transparent layer 4. This may be used as a strap or a key holder attachable to, for example, a mobile telephone. The hole 70 of the second transparent layer 4 may be formed at the same time when the outer shape is formed by the second transparent layer 4. By punching a hole in the second transparent layer 4, the figure including the colored layer 3, first transparent layer, and light reflective layer can avoid being damaged with a hole.

In the shaped article 50 illustrated in (d) of FIG. 8, the upper-half of a figure's body including the colored layer 3, first transparent layer, and light reflective layer is contained in the second transparent layer 4. This article 50 has, on the surface or inside of the second transparent layer 4, a three-dimensional image 71 decorated with a mark or a frame or painted in a pale color. This shaped article 50 further has, on the surface or inside of the second transparent layer 4, a letter/character area 72 with letters and/or characters representing date, name, or place. The decorated three-dimensional image 71 and the letter/character area 72 may be formed at the same time when the outer shape is formed by the second transparent layer 4. Instead of the decorated three-dimensional image 71 and the letter/character area 72, other additional information may be displayed on the surface or inside of the second transparent layer 4.

In (b)~(d) of FIG. 8, one figure is contained in the second transparent layer 4, however, the number of figures containable in the second transparent layer 4 may be other than one.

In case the shaped article according to this embodiment has a ring-like shape, the colored layer may be formed near an inner peripheral end of the ring shape as well as an outer peripheral end thereof. In conclusion, the colored layer may be formed on the surface of the shaped article, and the second transparent layer may be further formed thereon.

Instead of forming the second transparent layer 4 in any desired shape as described in this modified example, the second transparent layer 4 may be formed in a shape suitable for the surface of the light reflective layer 1 similarly to the earlier embodiment. In that case, the obtained shaped article may be sealed in an optionally-shaped resin.

Second Modified Example

In the embodiment described earlier, the shaped article 50 is manufactured by the inkjet head device 10 illustrated in FIG. 3. Instead of the inkjet head device 10, inkjet head devices illustrated in FIG. 10, FIG. 12, FIG. 13, and FIG. 14 may be used.

FIG. 10 is a drawing of a modified example of the inkjet head device, illustrated similarly to FIG. 3. The inkjet head device 10' illustrated in FIG. 10 has, on its lower surface, roughly two inkjet heads 11H' and 12H'. As illustrated in FIG. 10, the first inkjet head 11H' and the second inkjet head 12H' are displaced from each other in both of the X and Y directions. The first inkjet head 11H' is the same as the first inkjet head 11H illustrated in FIG. 3. The second inkjet head 12H' includes a white ink nozzle 10 (W) for discharging a white ink (W) used to form the light reflective layer 1 (parts 51 of the light reflective layer), and a transparent ink nozzle 10 (CL) for discharging a transparent ink (CL).

FIG. 12 is a drawing of another modified example of the inkjet head device, illustrated similarly to FIG. 3. In an inkjet head device 10a illustrated in FIG. 12, a cyan ink nozzle 10 (C), a magenta ink nozzle 10 (M), a yellow ink nozzle 10 (Y), a black ink nozzle 10 (K), a white ink nozzle 10 (W), and a transparent ink nozzle 10 (CL) are arranged in the mentioned order in the X direction.

FIG. 13 is a drawing of yet another modified example of the inkjet head device, illustrated similarly to FIG. 3. In an inkjet head device 10b illustrated in FIG. 13, a white ink nozzle 10 (W), a transparent ink nozzle 10 (CL), a yellow ink nozzle 10 (Y), a magenta ink nozzle 10 (M), a cyan ink nozzle 10 (C), a black ink nozzle 10 (K), a transparent ink nozzle 10 (CL), and a white ink nozzle 10 (W) are arranged in the mentioned order in the X direction.

FIG. 14 is a drawing of yet another modified example of the inkjet head device. An inkjet head device 10b illustrated in FIG. 14 has a carriage 21 allowed to reciprocate along the X axis, a plurality of nozzle arrays mounted in the carriage 21, and ultraviolet irradiators 24a and 24b mounted in the carriage 21. The carriage 21 is moved in the Y direction to perform a scan, in which the inks of ultraviolet curing type are discharged from the nozzle arrays and irradiated with ultraviolet light emitted from the ultraviolet irradiators 24a and 24b.

The nozzle arrays are aligned along the X direction as illustrated in FIG. 14. From the left to right in the X direction on the drawing, a cyan ink nozzle array C, a magenta ink nozzle array M, a yellow ink nozzle array Y, a black ink nozzle array K, a white ink nozzle array W, and a transparent ink nozzle array CL are aligned in the mentioned order. Since the nozzle arrays are mounted in the carriage 21, the inks of ultraviolet curing type are dischargeable from these nozzle arrays while moving in the X direction with the carriage 21.

Because all of the nozzles are aligned in the X direction in FIG. 12, FIG. 13, and FIG. 14, the formation of one layer may be completed by moving the nozzles once in the X direction and discharging all of the required ink during the movement. Referring to FIG. 14, since all of the inks may be discharged and irradiated with ultraviolet light by moving the nozzles just once in the X direction, a layer formed from the inks of ultraviolet curing type may be cured as soon as the inks are discharged.

[Additional Remarks]

A shaped article 50 according to one aspect includes: a light reflective layer 1 formed from a light reflective ink; a colored layer 3; and a second transparent layer 4 formed from a transparent ink, wherein the colored layer 3 is formed on an outer side of the light reflective layer 1, and the second transparent layer 4 is formed on an outer side of the colored layer 3.

In this shaped article, a larger formation area including an area overlapping the part 54, 54 (2) of the second transparent layer in addition to an area overlapping the part 53, 53 (1) of the colored layer in the lower layer may be secured for the part 53, 53 (2) of the colored layer in the upper layer, as compared to layers lacking the parts 54 of the second transparent layer at positions nearer to the end side than the parts 53 of the colored layer. This may help to mitigate a demanded degree of manufacturing accuracy to some extent, contributing to an improved manufacturing efficiency.

The manufacturing method for the shaped article 50 according to one aspect is a manufacturing method for forming the shaped article 50 by stacking a plurality of layers 50a on one another, the shaped article 50 including a second transparent layer 4 formed from a transparent ink; and a colored layer 3, wherein the second transparent layer 4 and the colored layer 3 are formed in this order from an outer-layer side toward an inner side of the shaped article 50. This method includes a layer forming process including forming the parts 54 of the second transparent layer and the parts 53 of the colored layer in this order from an end side toward a center side of at least two of the layers 50a.

According to the manufacturing method wherein the parts 54 of the second transparent layer are formed at positions nearer to the end side than the parts 53 of the colored layer, the ink applied to form the parts 54 of the second transparent layer, if dropping downward from positions at which the parts 54 should be formed during the manufacturing process, may be unlikely to adversely affect the color tone, because it is the colored layer 3 (parts 53 of the colored layer) that decides the color tone. This method may thus successfully manufacture the shaped article 50 that excels in reliability and exhibits a desired color tone (decorated as desired).

According to this method, a larger formation area including an area overlapping the part 54, 54 (2) of the second transparent layer in addition to an area overlapping the part 53, 53 (1) of the colored layer 3 in the lower layer may be secured for the part 53, 53 (2) of the colored layer 3 in the upper layer, as compared to layers lacking the parts 54 of the second transparent layer at positions nearer to the end side than the parts 53 of the colored layer. This may help to mitigate a demanded degree of manufacturing accuracy to some extent, contributing to an improved manufacturing efficiency.

The shaped article manufacturing method according to one aspect is further characterized in that the layer forming process includes steps of: forming the part 54 of the second transparent layer; and forming the part 53 of the colored layer, wherein the step of forming the part 54 of the transparent layer precedes the step of forming the part 53 of the colored layer.

According to this method that forms the part 54 of the second transparent layer in one layer 50a before the part 53 of the colored layer, the part 54 of the second transparent layer may serve as the outer moat of the part 53 of the colored layer to be later formed. This may prevent the ink applied to form the part 53 of the colored layer from spreading unintendedly or dropping downward.

The shaped article manufacturing method disclosed herein according to one aspect is further characterized in that one of the layers 50a is newly formed on another one of the layers 50a by the layer forming process, so that the part 53 of the colored layer in the layer 50a newly formed overlaps the part 54 of the second transparent layer in the layer 50a previously formed.

The shaped article manufacturing method disclosed herein according to one aspect is further characterized in that one of the layers 50a is newly formed on another one of the layers 50a by the layer forming process, so that the part 54 of the second transparent layer in the layer 50a newly formed overlaps the part 53 of the colored layer in the layer 50a previously formed.

This disclosure is not necessarily limited to the embodiment described so far and may be carried out in many other forms. The technical scope of this disclosure encompasses any modifications within its scope defined by the appended claims and embodiments obtained by variously combining the technical means disclosed herein. By variously combining the technical means disclosed in the embodiment and modified examples, additional technical features may be further presented.

INDUSTRIAL APPLICABILITY

This disclosure may be applicable to shaped article manufacturing methods and manufacturing apparatuses for implementing the methods. This disclosure is particularly useful in manufacturing a three-dimensional shaped article decorated as desired, for example, decorated in full colors.

The invention claimed is:

1. A shaped article, having a plurality of forming layers which are formed by ink droplets ejected by using an inkjet printing technique, and the plurality of forming layers are stacked in a layer-stacked direction to obtain the shaped article, and the shaped article comprising:
    a decorative layer, a first transparent layer and a light reflective layer are provided in this order from an outer-layer side of the shaped article toward an inner side of the shaped article;
    wherein the light reflective layer is made of an ink having light reflectiveness;
    the first transparent layer is made of a transparent ink,
    wherein the decorative layer comprises a color ink, and a part of the plurality of the forming layers comprises a transparent supplementary ink and the color ink,
    wherein the transparent supplementary ink is configured to not adversely affect a color tone to be expressed by the decorative layer;
    wherein the decorative layer comprises:
        a first part, which is composed of only the color ink; and
        a second part, which is composed of the color ink and the transparent supplementary ink.

2. The shaped article according to claim 1, wherein the light reflective layer is made of an ink containing a white pigment.

3. The shaped article according to claim 1, further comprising:
    a second transparent layer, being made of a transparent ink and provided on the outer-layer side of the decorative layer.

4. The shaped article according to claim 1, wherein with respect to a part of the decorative layer in which a decorative ink alone is insufficient to meet a predetermined ink density of the decorative layer, the ink density of the decorative layer is filled by using the transparent supplementary ink.

5. The shaped article according to claim 1, wherein the shaped article includes the plurality of forming layers stacked on one another, and
    at least two of the plurality of forming layers each include a part of the decorative layer, a part of the first transparent layer, and a part of the light reflective layer that are provided in this order from an end side toward a center of each one of the forming layers.

6. The shaped article according to claim 5, further comprising:
    a second transparent layer, being made of a transparent ink and provided on the outer-layer side of the decorative layer, wherein
    the at least two of the plurality of forming layers each include a part of the decorative layer between a part of the first transparent layer and a part of the second transparent layer.

7. The shaped article according to claim 6, wherein
    a region is provided in which the forming layers are stacked on one another, the forming layers each including a part of the decorative layer between a part of the first transparent layer and a part of the second transparent layer, wherein
    in a portion of the region with no overlap between a part of the decorative layer in one of the forming layers and a part of the decorative layer in another one of the forming layers on or below the one of the forming layers, there is an overlap between a part of the decorative layer in one of the forming layers and a part of the first transparent layer or a part of the second transparent layer in another one of the forming layers on or below the one of the forming layers.

8. The shaped article according to claim 2, wherein the shaped article includes the plurality of forming layers stacked on one another, and
    at least two of the plurality of forming layers each include a part of the decorative layer, a part of the first transparent layer, and a part of the light reflective layer that are provided in this order from an end side toward a center of each one of the forming layers.

9. The shaped article according to claim 3, wherein the shaped article includes the plurality of forming layers stacked on one another, and
    at least two of the plurality of forming layers each include a part of the decorative layer, a part of the first transparent layer, and a part of the light reflective layer that are provided in this order from an end side toward a center of each one of the forming layers.

10. The shaped article according to claim 4, wherein the shaped article includes the plurality of forming layers stacked on one another, and
    at least two of the plurality of forming layers each include a part of the decorative layer, a part of the first transparent layer, and a part of the light reflective layer that are provided in this order from an end side toward a center of each one of the forming layers.

* * * * *